(12) United States Patent
Kato et al.

(10) Patent No.: US 7,602,452 B2
(45) Date of Patent: Oct. 13, 2009

(54) LIQUID CRYSTAL DISPLAY DEVICE AND METHOD FOR MANUFACTURING THE SAME

(75) Inventors: Takayuki Kato, Tottori (JP); Hiroki Sugiyama, Tottori (JP); Shinichiro Nomura, Tottori (JP); Takao Atarashiya, Tottori (JP); Satoshi Morita, Tottori (JP); Takashi Sato, Tottori (JP)

(73) Assignee: Epson Imaging Devices Corp., Tokyo (JP)

( * ) Notice: Subject to any disclaimer, the term of this patent is extended or adjusted under 35 U.S.C. 154(b) by 407 days.

(21) Appl. No.: 11/519,032

(22) Filed: Sep. 12, 2006

(65) Prior Publication Data

US 2007/0058097 A1 Mar. 15, 2007

(30) Foreign Application Priority Data

| Sep. 13, 2005 | (JP) | ............................. 2005-264825 |
| Oct. 31, 2005 | (JP) | ............................. 2005-315728 |
| Oct. 31, 2005 | (JP) | ............................. 2005-315730 |
| Jul. 4, 2006 | (JP) | ............................. 2006-184115 |

(51) Int. Cl.
*G02F 1/1343* (2006.01)

(52) U.S. Cl. .............................. 349/38; 349/33; 438/30; 257/E21.535

(58) Field of Classification Search .................... 349/33, 349/36–38; 438/30; 257/E21.535
See application file for complete search history.

(56) References Cited

U.S. PATENT DOCUMENTS 6,356,318 B1 3/2002 Kawahata 6,392,255 B1 * 5/2002 Shibata et al. ................ 257/59

(Continued)

FOREIGN PATENT DOCUMENTS

CN 1290039 A 4/2001

(Continued)

*Primary Examiner*—Ellen Kim
(74) *Attorney, Agent, or Firm*—Westerman, Hattori, Daniels & Adrian, LLP.

(57) ABSTRACT

A liquid crystal display device 10 includes: a transparent substrate 11; a plurality of signal lines 17 and scan lines 16 arranged on the transparent substrate 11 in a matrix; a plurality of auxiliary capacitor lines 18 provided between the scan lines 16 so as to be in parallel with the scan lines 16; thin film transistors (TFTs) each provided in a vicinity of an intersection of the signal lines 17 and scan lines 16; and pixel electrodes 20 arranged in respective positions defined by the signal lines 17 and the scan lines 16 and each electrically connected to a drain electrode D of the thin film transistor (TFT); in which the thin film transistor (TFT)'s gate electrode G and the scan line 16 are covered by a gate insulating film formed by an insulating film (a first layer) 25 and an insulating layer (a second layer) 26, and the drain electrode D of the thin film transistor (TFT) extends to overlie an auxiliary capacitor electrode 18a, with the insulating layer (the second layer) 26 interposed between the drain electrode D and the auxiliary capacitor electrode 18a. As a result, it will be possible to provide a liquid crystal display device and a method for manufacturing the same are provided, in which the capacitance of an auxiliary capacitor electrode is increased without reducing the aperture ratio of each pixel and which is suitable to realize a relatively small pixel area and high definition.

18 Claims, 11 Drawing Sheets

U.S. PATENT DOCUMENTS

| | | |
|---|---|---|
| 6,624,012 B2 | 9/2003 | Shibata et al. |
| 6,924,859 B2 | 8/2005 | Ishii et al. |
| 6,998,299 B2 | 2/2006 | Shibata et al. |
| 7,282,737 B2 | 10/2007 | Shibata et al. |
| 2003/0038306 A1* | 2/2003 | Izumi et al. ................. 257/222 |
| 2004/0114059 A1 | 6/2004 | Lee et al. |
| 2004/0141100 A1* | 7/2004 | Tsubata et al. ................ 349/44 |
| 2005/0092992 A1* | 5/2005 | Nagata et al. ................. 257/59 |
| 2005/0285987 A1* | 12/2005 | Azumada et al. .............. 349/43 |
| 2006/0009108 A1* | 1/2006 | Shigeno ....................... 445/24 |
| 2006/0267969 A1* | 11/2006 | Doi et al. .................... 345/204 |
| 2007/0146566 A1* | 6/2007 | Hosoya ....................... 349/43 |
| 2008/0036935 A1 | 2/2008 | Shibata et al. |
| 2008/0198108 A1* | 8/2008 | Aoki ........................... 345/87 |
| 2008/0254598 A1* | 10/2008 | Yamazaki et al. ........... 438/473 |

FOREIGN PATENT DOCUMENTS

| | | |
|---|---|---|
| CN | 1439928 A | 9/2003 |
| CN | 1488083 A | 4/2004 |
| JP | 07-191348 A | 7/1995 |
| JP | 2584290 B | 11/1996 |
| JP | 10-048668 A | 2/1998 |
| JP | 2827570 B | 9/1998 |
| JP | 2874256 B | 1/1999 |
| JP | 2001-013520 A | 1/2001 |
| JP | 2005-506575 A | 3/2005 |
| JP | 2005-217342 A | 8/2005 |
| WO | WO 03/036374 A1 | 5/2003 |

\* cited by examiner

Fig.4
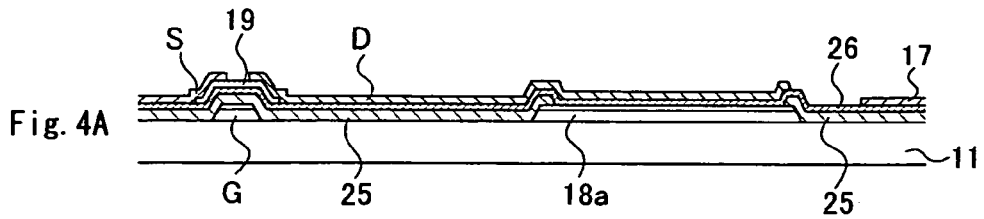
Fig. 4A
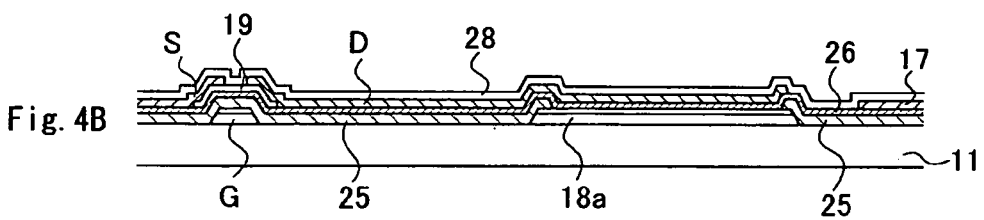
Fig. 4B
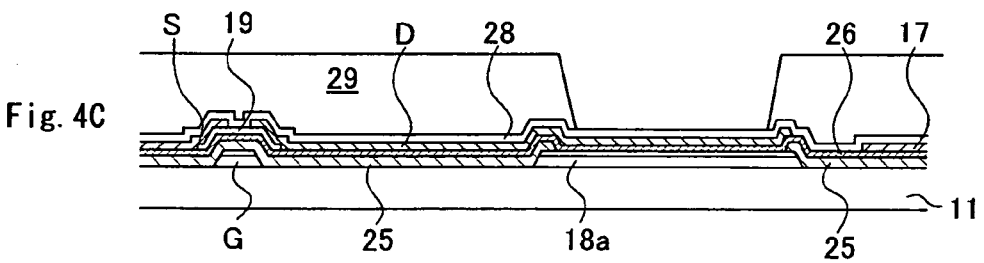
Fig. 4C
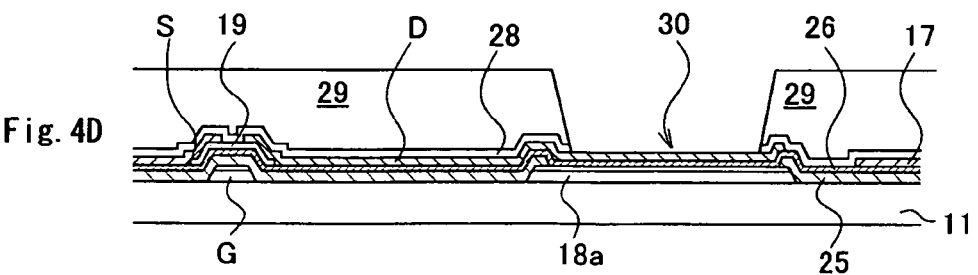
Fig. 4D
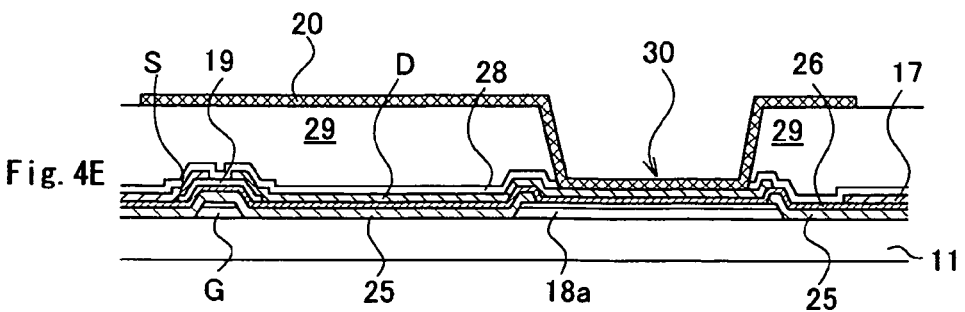
Fig. 4E Fig.5
Fig. 5A
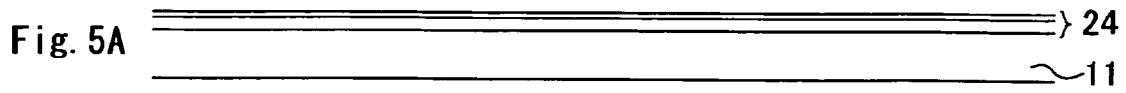
Fig. 5B
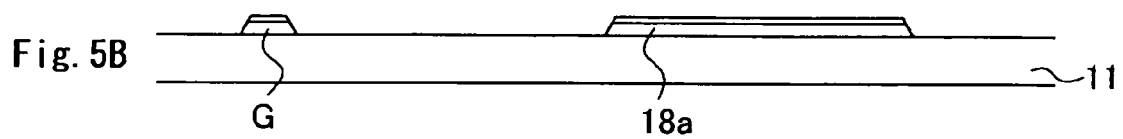
Fig. 5C
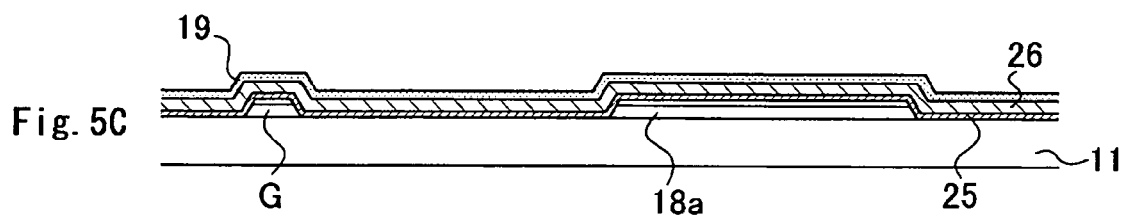
Fig. 5D
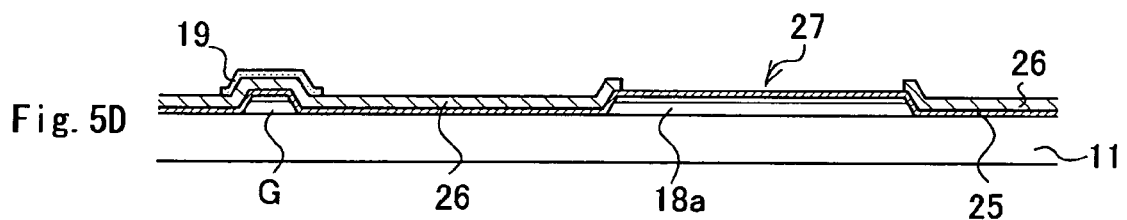
Fig. 5E
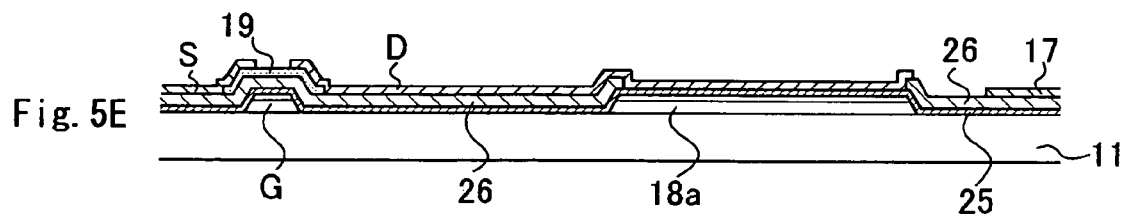

Fig.6
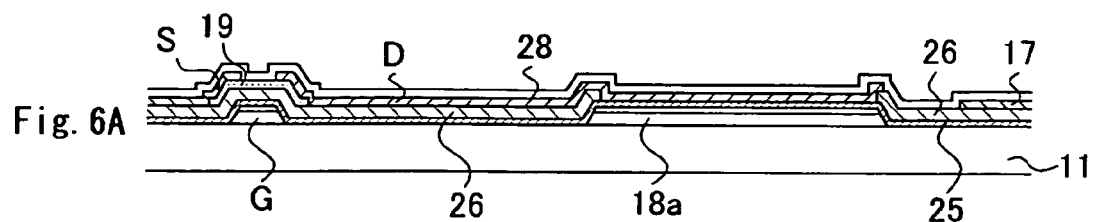
Fig. 6A
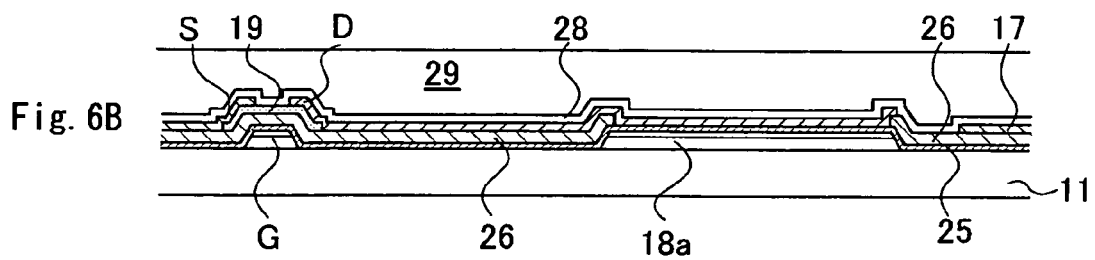
Fig. 6B
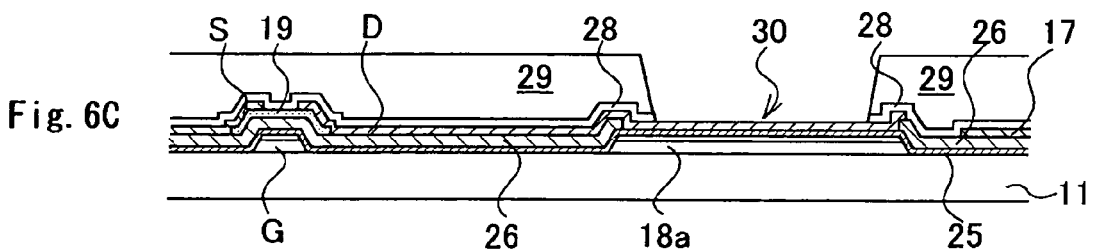
Fig. 6C
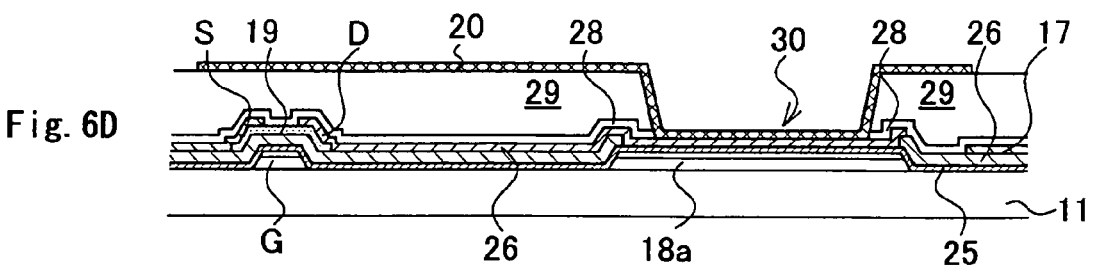
Fig. 6D Fig.7
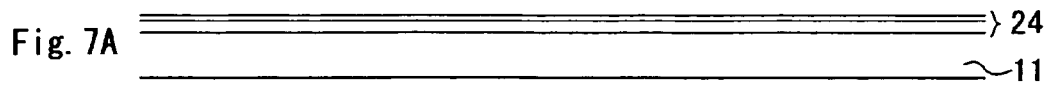
Fig. 7A
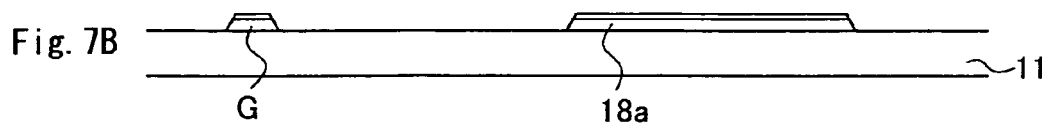
Fig. 7B
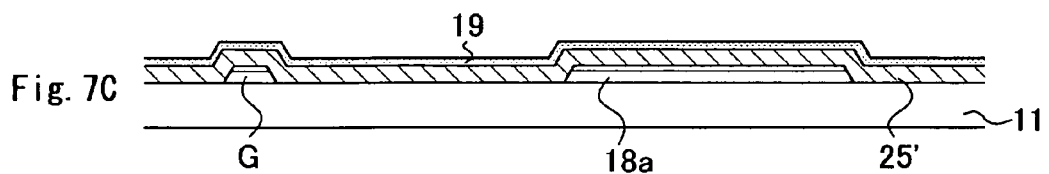
Fig. 7C
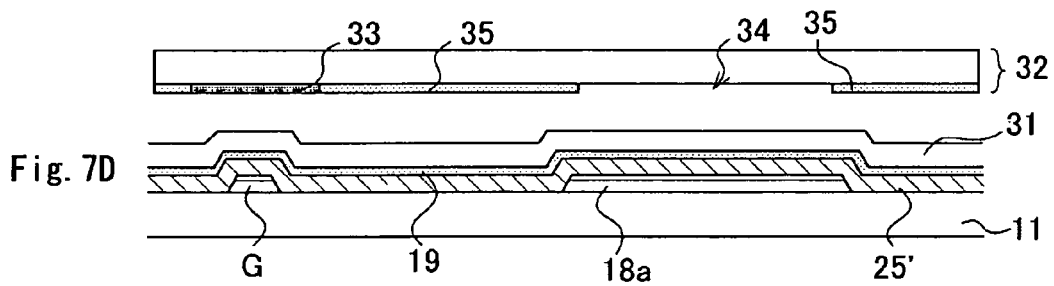
Fig. 7D
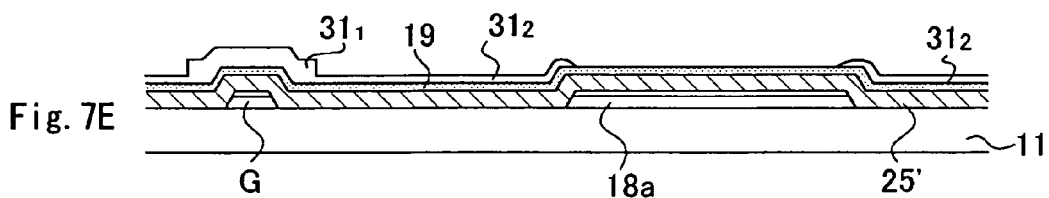
Fig. 7E
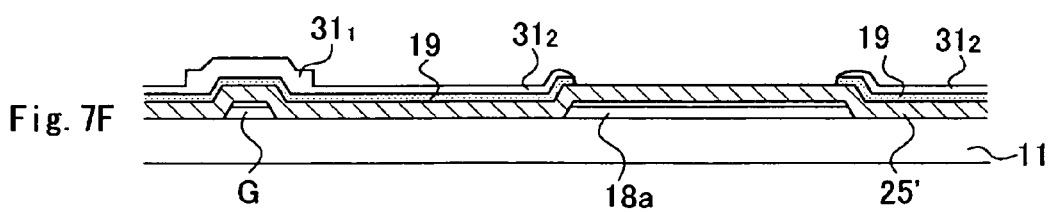
Fig. 7F Fig.9
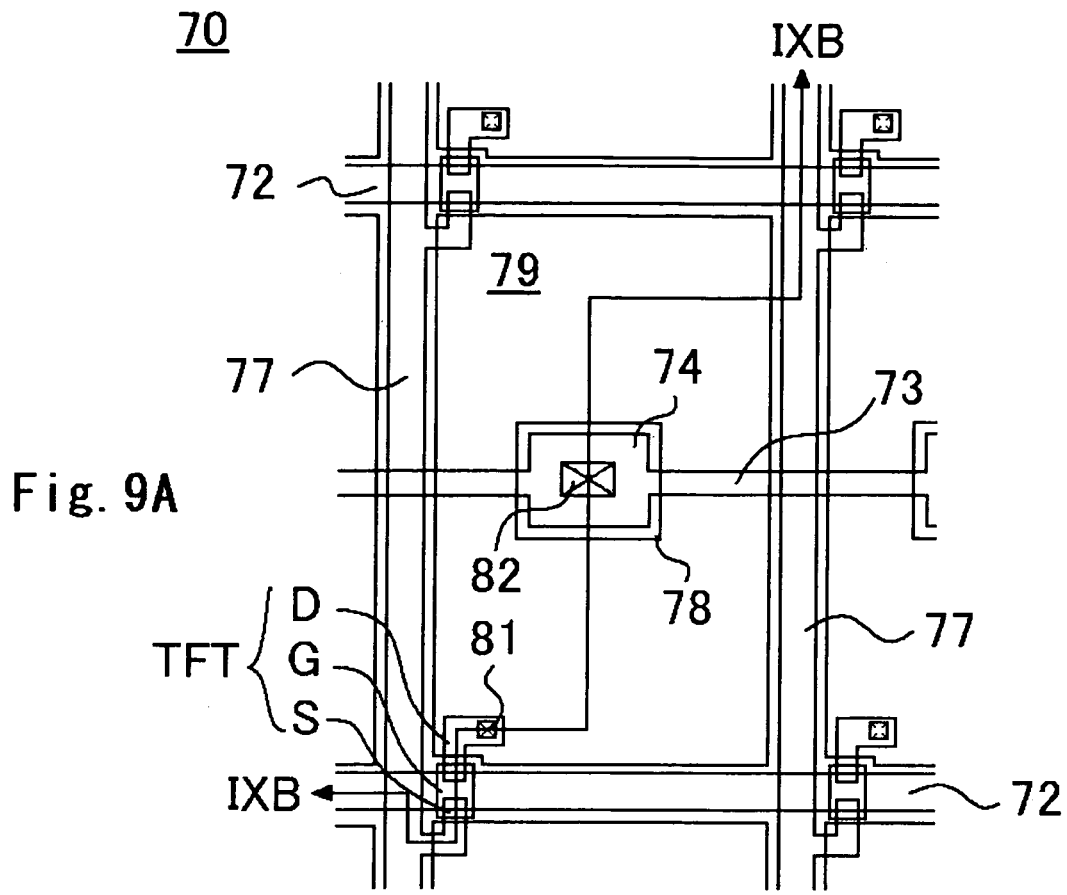
Fig. 9A
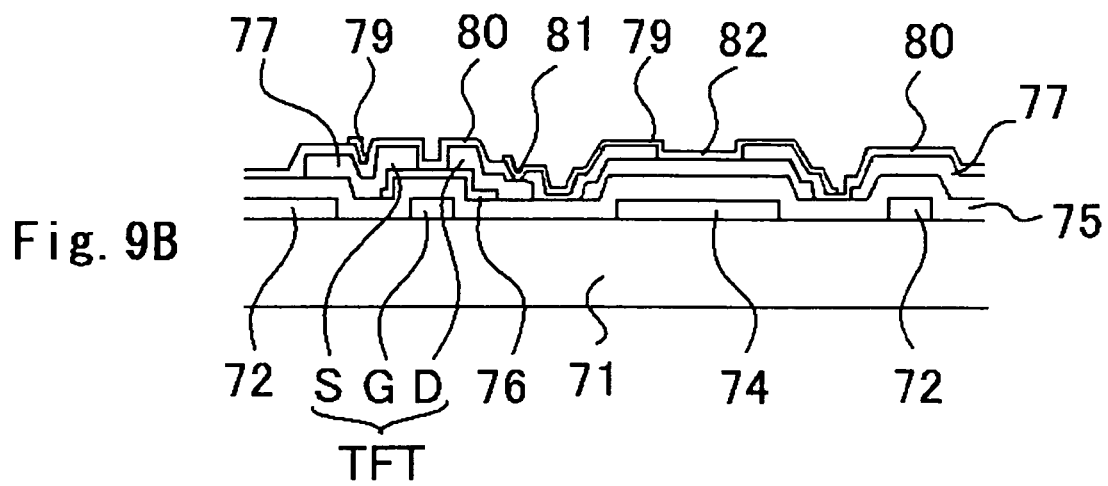
Fig. 9B Fig.11
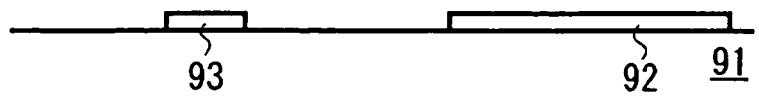
Fig. 11A
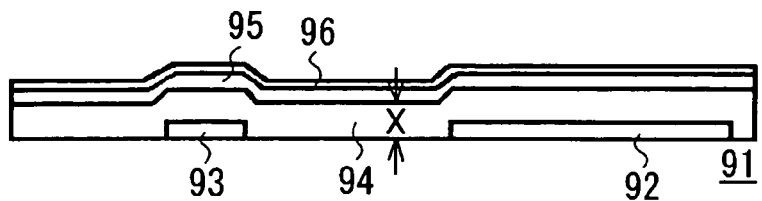
Fig. 11B
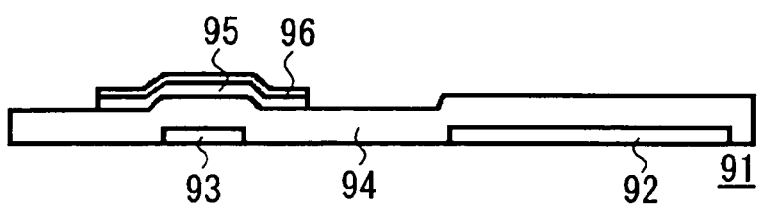
Fig. 11C
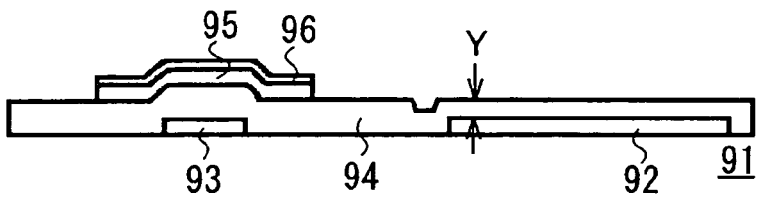
Fig. 11D
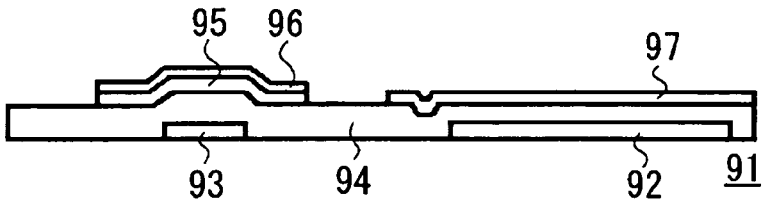
Fig. 11E
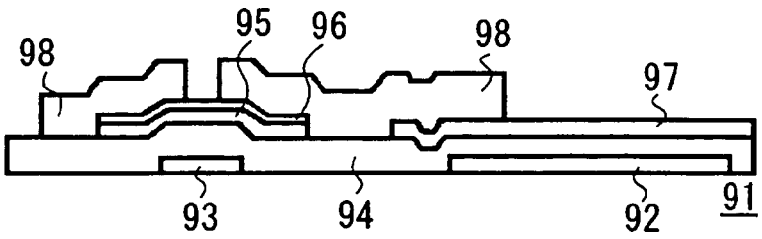
Fig. 11F
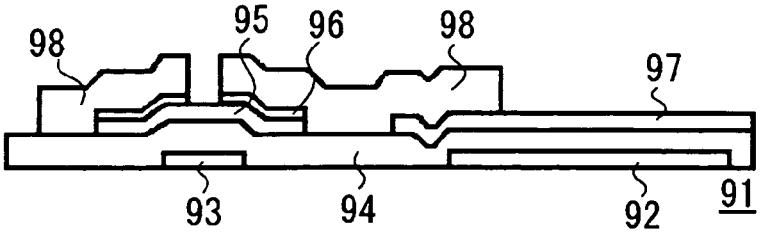
Fig. 11G

LIQUID CRYSTAL DISPLAY DEVICE AND METHOD FOR MANUFACTURING THE SAME

FIELD OF THE INVENTION

The present invention relates to a liquid crystal display device and a method for manufacturing the same. In particular, the present invention relates to a liquid crystal display device and a method for manufacturing the same, in which the capacitance of an auxiliary capacitor electrode is increased without reducing the aperture ratio of each pixel and which is suitable to realize a relatively small pixel area and high definition.

BACKGROUND OF THE INVENTION

In recent years, liquid crystal display devices are often used not only in information and communications equipment but also in general electrical equipment. A liquid crystal display device is composed of a pair of substrates made of glass or the like on the surfaces of which electrodes and the like are formed, and a liquid crystal layer formed between the pair of substrates. Applying a voltage to the electrodes on the substrate causes the liquid crystal molecules to array themselves so as to vary light transmissivity, thereby displaying various images.

Such a liquid crystal display device includes an array substrate and a color filter substrate, and liquid crystal is sealed between the two substrates. Scan lines and signal lines are arranged in a matrix on the surface of the array substrate. Thin film transistors (TFTs), pixel electrodes, and auxiliary capacitor lines are disposed in the regions enclosed by the two types of lines. The TFTs are switching elements for driving the liquid crystal. The pixel electrodes serve to apply a voltage to the liquid crystal. The auxiliary capacitor lines form an auxiliary capacitor for maintaining signals. Color filters for, e.g., red (R), green (G), and blue (B), a common electrode, etc., are formed on the surface of the color filter substrate.

The auxiliary capacitor lines formed on the array substrate are provided to form auxiliary capacitors for maintaining the electric charge of signals supplied from the signal lines for a predetermined period of time. Each auxiliary capacitor employs an auxiliary capacitor line and a part of a drain electrode of a TFT or a part of a pixel electrode as its electrodes, and a gate insulating film that covers the gate electrode of the TFT as its dielectric, in order to serve as a capacitor. The auxiliary capacitor lines are generally formed of a light-blocking conductive material, such as aluminum, molybdenum, chromium, or the like.

In order to prevent crosstalk or flicker of the liquid crystal display device, the auxiliary capacitors need to have a large capacitance. However, since recent technological innovation has allowed liquid crystal display devices to become increasingly smaller and achieve higher definition, making the size of individual pixels smaller, it is practically difficult, considering the aperture ratio of each pixel, to widen the auxiliary capacitor lines to increase the auxiliary capacitance.

As a solution to the above problem, a technique as disclosed in JP-T-2005-506575 (FIGS. 8 and 9, paragraphs [0069] to [0085]) has been proposed. An array substrate 70 of a liquid crystal display device as disclosed in this exemplary related art will now be described with reference to FIG. 9. FIG. 9A is a plan view of the array substrate, and FIG. 9B is a cross-sectional view thereof taken along line IXB-IXB of FIG. 9A.

In the array substrate 70 of this liquid crystal display device, as illustrated in FIGS. 9A and 9B, scan lines 72, auxiliary capacitor lines 73, and rectangular auxiliary capacitor patterns 74 made of a conductive material such as aluminum, chromium, molybdenum, chromium nitride, molybdenum nitride, or an alloy thereof, are formed on a transparent insulating substrate 71. The scan line 72 is connected to a gate electrode G of a thin film transistor (TFT), and the auxiliary capacitor pattern 74 is connected to the auxiliary capacitor line 73.

On the insulating substrate 71, a gate insulating film 75 made of an insulating material, such as silicon nitride or silicon oxide, and having a thickness of 2500 to 4500 Å is formed so as to cover the scan line 72, the auxiliary capacitor line 73, and the auxiliary capacitor pattern 74. On the gate insulating film 75, a semiconductor pattern 76 made of amorphous silicon or the like is formed so as to overlie the gate electrode G. On a part of the semiconductor pattern 76 and the gate insulating film 75, signal lines 77 and an auxiliary-capacitor-use conductive pattern 78 (i.e., a conductive pattern for the auxiliary capacitor) made of a conductive material are formed. The signal line 77 extends in a vertical direction and serves also as a source electrode S of the TFT.

The auxiliary-capacitor-use conductive pattern 78 is formed on the same layer as the signal line 77 so as to assume the form of an island, and forms an auxiliary capacitor in conjunction with the auxiliary capacitor pattern 74 positioned below and the gate insulating film 75 in between. The auxiliary-capacitor-use conductive pattern 78 is electrically connected to a pixel electrode 79, which will be described below.

In addition, a protective insulating film 80 made of an insulating material, such as silicon nitride or silicon oxide, and having a thickness of 500 to 2000 Å covers the signal lines 77, the auxilliary-capacitor use conductive pattern 78, and the semiconductor pattern 76. The protective insulating film 80 is provided with a contact hole 81 at a position above the drain electrode D and an opening 82 at a position above the auxiliary-capacitor-use conductive pattern 78. The pixel electrode 79 is formed on the protective insulating film 80 so that the pixel electrode 79 and the drain electrode D are electrically connected to each other via the contact hole 81, and the auxiliary-capacitor-use conductive pattern 78 and the pixel electrode 79 are connected to each other via the opening 82. Thus, the auxiliary-capacitor-use conductive pattern 78 and the drain electrode D are electrically connected to each other via the pixel electrode 79. The pixel electrode 79 is formed of a transparent conductive material, such as indium tin oxide (ITO) or indium zinc oxide (IZO).

In the above technique, the pixel electrode 79 overlies the auxiliary capacitor line 73 and the auxiliary-capacitor-use conductive pattern 78, and forms an auxiliary capacitor in conjunction with the auxiliary capacitor line 73, with the protective insulating film 80 and the gate insulating film 75 interposed between the two. In addition, the pixel electrode 79 is electrically connected to the auxiliary-capacitor-use conductive pattern 78, and the auxiliary-capacitor-use conductive pattern 78 forms another auxiliary capacitor in conjunction with the auxiliary capacitor pattern 74, with the gate insulating film 75 interposed between the two. Because the thickness of the gate insulating film 75 positioned between the auxiliary-capacitor-use conductive pattern 78 and the auxiliary capacitor pattern 74 is small, a larger capacitance is secured in this case than in the case where the auxiliary capacitor is formed by the auxiliary capacitor pattern 74 and the overlying pixel electrode 79, although the overlie area is the same. Therefore, in the liquid crystal display device as disclosed in JP-T-2005-506575 (FIGS. 8 and 9 and paragraphs [0069] to [0085]), it is possible to increase the capacitance without increasing the areas of the auxiliary capacitor patterns 74 and the auxiliary capacitor lines 73, and therefore the ratio of the capacitance to the aperture ratio can be improved.

However, in the array substrate 70 of the liquid crystal display device as disclosed in JP-T-2005-506575 (FIGS. 8 and 9 and paragraphs [0069] to [0085]), each capacitor (i.e., auxiliary capacitor) employs an auxiliary-capacitor-use conductive pattern 78 and auxiliary capacitor pattern 74 as its electrodes and the gate insulating film 75 positioned between the two as its dielectric. The thickness of the gate insulating film 75, although purportedly small, is nevertheless 2500 to 4500 Å, which is not sufficiently small to secure an auxiliary capacitance sufficient for preventing display troubles, such as crosstalk, flickering, etc., without increasing the area of the auxiliary capacitor pattern 74, which is made of a light-blocking conductive material. In other words, in the array substrate 70 of the liquid crystal display device as disclosed in JP-T-2005-506575 (FIGS. 8 and 9 and paragraphs [0069] to [0085]), although an increase in the auxiliary capacitance could be accomplished by making the thickness of the gate insulating film 75 smaller, that would cause difficulty in maintaining electrical isolation between the gate electrode G and the scan line 72, which are covered by the gate insulating film 75, and other components.

As another example of related art for achieving an auxiliary capacitor with large capacitance, an array substrate of a liquid crystal display device 90 as disclosed in Japanese Patent No. 2,584,290 (Claims, page 2, column 4, line 30 to page 3, column 5, line 17, and FIGS. 1 and 2) will now be described with reference to FIGS. 10 and 11. FIG. 10 is a plan view of the array substrate as disclosed in Japanese Patent No. 2,584,290 (Claims, page 2, column 4, line 30 to page 3, column 5, line 17, and FIGS. 1 and 2), the view illustrating a portion thereof corresponding to a few pixels. FIGS. 11A to 11G are partial cross-sectional views of the array substrate of FIG. 10, the views illustrating processes for manufacturing it in sequential order. First, a pattern of an auxiliary capacitor line 92 made of indium tin oxide (ITO) is formed on an insulating substrate 91 made of a glass plate. Next, a gate metal film 93 is formed and patterned (FIG. 11A).

Then, by plasma CVD or the like, a gate insulating film 94 made of SiNx or SiOx, an amorphous semiconductor film 95 to serve as an active layer made of, e.g., a-Si, and a semiconductor film 96 (for Ohmic contact) constituted by, e.g., an n$^+$a-Si layer doped with impurities are formed sequentially (FIG. 11B). At this time, the thickness X of the gate insulating film 94 is set to be sufficiently large, e.g., X=4000 Å, to prevent a short-circuit from occurring between the drain and gate or between the source and gate.

Next, the semiconductor film 96 (for Ohmic contact) and the amorphous semiconductor film 95 are subjected to etching using the same resist to form patterns (FIG. 11C). Then, a resist (not shown in FIG. 11) is applied that is provided with an opening pattern at a portion thereof corresponding to the position (indicated by a broken line in FIG. 10) at which the auxiliary capacitor line 92 will be overlain by a pixel electrode 97, which will be formed in a later process. Then, using etchant for the gate insulating film 94, etching is performed to cause the gate insulating film 94 to have at that position a desired smaller thickness Y=2000 Å so as to serve as an insulating film for the auxiliary capacitor (FIG. 11D).

Next, the pixel electrode 97 made of ITO is formed and patterned (FIG. 11E). Further, a metal film 98 for the drain and the source is formed and patterned (FIG. 11F), and a portion of the semiconductor film 96 (for Ohmic contact) that is present at a channel portion of the TFT is removed by etching, whereupon manufacture of the array substrate for the liquid crystal display device is completed (FIG. 11G). The liquid crystal display device 90 is obtained by arranging the array substrate manufactured by the above processes and a common electrode substrate so as to face each other with a liquid crystal material between them.

In the above known technique, the auxiliary capacitor line 92 and the pixel electrode 97 correspond to the electrodes of a capacitor, and the gate insulating film 94 positioned between the auxiliary capacitor line 92 and the pixel electrode 97 corresponds to the dielectric of the capacitor. The portion of the gate insulating film 94 that is positioned above the gate electrode 93 has a thickness X=4000 Å, whereas the insulating film above the auxiliary capacitor line 92 has a thickness Y=2000 Å. Therefore, short-circuits are less likely to occur between the drain and the gate or between the source and the gate, and at the same time, a sufficient auxiliary capacitance can be secured without the need to increase the area of the auxiliary capacitor line 92.

In the above-described array substrate of the liquid crystal display device 70 as disclosed in JP-T2005-506575 (FIGS. 8 and 9 and paragraphs [0069] to [0085]), securing an auxiliary capacitance sufficient to prevent display troubles requires the auxiliary capacitor pattern to have a large area, which results in the aperture ratio being reduced. In addition, because the TFT and the auxiliary-capacitor-use conductive pattern 78 are present as light-blocking members within the pixel, the aperture ratio is further reduced. On the other hand, in the above-described array substrate of the liquid crystal display device 90 as disclosed in Japanese Patent No. 2,584,290 (Claims, page 2, column 4, line 30 to page 3, column 5, line 17, and FIGS. 1 and 2), the portion of the gate insulating film that is positioned above the auxiliary capacitor line is partially removed by etching to obtain a thinner insulating film, and thereby the auxiliary capacitance is increased while maintaining electrical isolation between the gate electrode and the scan line, which are covered by the gate insulating film, and other components. However, it is difficult to control the amount of etching so as to obtain the desired thickness by partial removal of the auxiliary capacitor line portion of the gate insulating film, and it is difficult to maintain uniformity of the thickness of the auxiliary capacitor line portion of the gate insulating film across liquid crystal display devices.

In addition, in the array substrate of the liquid crystal display device 90 as disclosed in Japanese Patent No. 2,584,290 (Claims, page 2, column 4, line 30 to page 3, column 5, line 17, and FIGS. 1 and 2), after the auxiliary capacitor line 92 made of ITO is formed and patterned on the insulating substrate 91 formed of a glass plate, the gate metal film 93 is formed and patterned to form the scan line and the gate electrode. Thus, the number of processes is increased, resulting in reduction in production efficiency. Further, out of consideration for mask displacement or the like, there must be a long distance between the pixel electrode 97 and the metal film 98 for the source, so that it is impossible to arrange the pixel electrode so as to overlie the TFT. As a result, the aperture ratio is reduced. Therefore, it is difficult to use this array substrate as a method for forming auxiliary capacitors in the liquid crystal display devices of recent years, which have a relatively small pixel area and high definition.

SUMMARY OF THE INVENTION

In view of the above problems, the present inventors have considered a method for forming an auxiliary capacitor with improved efficiency that can be effectively used in a liquid crystal display device having a high aperture ratio, a relatively small pixel area, and a high definition without the need for an increased number of processes for manufacture thereof. As a result, the inventors arrived at the present invention when they discovered that the capacitance of the auxiliary capacitor can be increased, without the need to increase the number of processes for manufacture or reduce the aperture ratio, by employing an extended drain electrode of the TFT as an electrode that forms a pair with the auxiliary capacitor line that serves as one of the electrodes of the capacitor that forms the auxiliary capacitance, and replacing the gate insulating film positioned between the auxiliary capacitor line and the drain electrode with an insulating layer of smaller thickness than that of the gate insulating film to shorten the distance between the auxiliary capacitor line and the drain electrode.

An object of the present invention is to provide a liquid crystal display device and a method for manufacturing the same, the device having a small pixel area or high definition pixels and capable of preventing display troubles, such as crosstalk, flickering, etc., without the aperture ratio of each pixel being reduced.

In one aspect of the present invention, there is provided a liquid crystal display device that includes: a transparent substrate; a plurality of signal lines and scan lines arranged on the transparent substrate in a matrix; a plurality of auxiliary capacitor lines provided between the scan lines so as to be in parallel with the scan lines; thin film transistors each provided in the vicinity of an intersection of the signal lines and scan lines; and pixel electrodes arranged in respective positions defined by the signal lines and the scan lines and each electrically connected to a drain electrode of a thin film transistor; wherein, the thin film transistor's gate electrode and the scan line are covered by a gate insulating film, and the drain electrode of the thin film transistor extends to overlie the auxiliary capacitor line, with an insulating layer having a smaller thickness than that of the gate insulating film being interposed between the drain electrode and the auxiliary capacitor line.

In the above-described liquid crystal display device of the present invention, the gate insulating film may be constituted by a plurality of layers, and the insulating layer may be constituted by at least one of the plurality of layers.

Also, in the above-described liquid crystal display device of the present invention, the insulating layer may be constituted by the uppermost one of the plurality of layers that constitute the gate insulating film.

Also, in the above-described liquid crystal display device of the present invention, the insulating layer may be constituted by that one of the plurality of layers that constitute the gate insulating film that is the closest to the transparent substrate.

Also, in the above-described liquid crystal display device of the present invention, the insulating layer may be constituted by the thinnest of the plurality of layers that constitute the gate insulating film.

Also, in the above-described liquid crystal display device of the present invention, the edges of the thin portions of the insulating layer which is positioned above the auxiliary capacitor line may be positioned inside of the edges of the auxiliary capacitor line.

Also, in the above-described liquid crystal display device of the present invention, the thickness of the gate insulating film may be in the range of 2500 to 5500 Å, and the thickness of the insulating layer may be in the range of 500 to 1500 Å.

Also, the above-described liquid crystal display device of the present invention may further include an interlayer insulating film formed between the pixel electrode and the drain electrode, and a contact hole formed at the portion of the interlayer insulating film that is positioned over the auxiliary capacitor line, the pixel electrode and the drain electrode being electrically connected to each other via the contact hole.

Also, the above-described liquid crystal display device of the present invention may further include a reflective film formed on the front or back surface of the pixel electrode so as to cover either the thin film transistor and the auxiliary capacitor line or the entire area of positions corresponding to the pixel electrode.

In another aspect of the present invention, there is provided a method for manufacturing a liquid crystal display device, the method including: (a) arranging, on a transparent substrate, a plurality of scan lines connecting with gate electrodes and a plurality of auxiliary capacitor lines so as to be in parallel with each other; (b) forming a gate insulating film so as to cover the entire area of the transparent substrate; (c) making thinner the portion of the gate insulating film positioned above the auxiliary capacitor line, so as to form an insulating layer with a smaller thickness than that of the region surrounding the auxiliary capacitor line; and (d) forming a drain electrode of a thin film transistor above the gate insulating film and extending the drain electrode of the thin film transistor so as to cover the insulating layer positioned above the auxiliary capacitor line, thereby forming an auxiliary capacitor.

In the above-described method for manufacturing a liquid crystal display device of the present invention, step (c) may include: forming a semiconductor layer on the gate insulating film; applying photoresist onto the surface of the semiconductor layer; by use of a halftone mask, removing an auxiliary capacitor formation portion of the photoresist, above the auxiliary capacitor line, and allowing thick photoresist to remain at a position corresponding to the gate electrode and thin photoresist to remain at the other positions; after removing the auxiliary capacitor portion of the semiconductor layer, which is exposed, further etching away a portion of the gate insulating film corresponding to the auxiliary capacitor formation portion, so as to form an insulating layer with a smaller thickness than that of the portion of the gate insulating film that surrounds the insulating layer,; removing the thin photoresist to allow the photoresist to remain only at a position corresponding to the gate electrode; removing an exposed portion of the semiconductor layer by etching; and removing the remaining portions of the photoresist.

Also, in the above-described method for manufacturing a liquid crystal display device of the present invention, step (b) may include forming a plurality of layers to form the gate insulating film, and step (c) may include removing at least one of the plurality of layers.

Also, in the above-described method for manufacturing a liquid crystal display device of the present invention, the removing of at least one of the plurality of layers may consist of removing that one of the plurality of layers that was formed first.

Also, in the above-described method for manufacturing a liquid crystal display device of the present invention, the removing of at least one of the plurality of layers may consist of removing that one of the plurality of layers that was formed last.

Also, in the above-described method for manufacturing a liquid crystal display device of the present invention, the plurality of layers that constitute the gate insulating film may all be made of an identical material and have been formed by setting a different substrate temperature for each layer.

Also, in the above-described method for manufacturing a liquid crystal display device of the present invention, the highest substrate temperature may be set when forming the first gate insulating film, and progressively lower substrate temperatures may be set for the subsequent gate insulating film in order of formation.

Also, in the above-described method for manufacturing a liquid crystal display device of the present invention, the plurality of layers that constitute the gate insulating film may all be made of the same material and have been formed by using, for each layer, a different ingredient for a surrounding atmospheric gas.

Also, the above-described method for manufacturing a liquid crystal display device of the present invention may further include: forming an interlayer insulating film so as to cover the drain electrode; forming a contact hole at the portion of the interlayer insulating film that corresponds to the position where the drain electrode overlies the auxiliary capacitor line; and forming, on the interlayer insulating film, a pixel electrode so as to be electrically connected to the drain electrode via the contact hole.

Also, the above-described method for manufacturing a liquid crystal display device of the present invention may further include forming, prior to or after the forming of the pixel electrode, a reflector plate either at positions corresponding to the thin film transistor and the auxiliary capacitor line or in the entire region corresponding to the pixel electrode.

As such, the present invention produces excellent effects as described below. In the liquid crystal display device of the present invention, the drain electrode connected to the pixel electrode is provided above a part of the auxiliary capacitor line, with the insulating layer, which is a part of the gate insulating film constituted by a plurality of layers, between the part of the auxiliary capacitor line and the drain electrode. The thickness of this insulating layer is smaller than that of the portion of the gate insulating film that covers the region surrounding the auxiliary capacitor line. Since this insulating layer constitutes a dielectric layer of the auxiliary capacitor, the auxiliary capacitance is greatly increased. Thus, a liquid crystal display device is obtained that is capable of preventing display troubles such as crosstalk, flickering, etc., without the area of the auxiliary capacitor line being increased.

Generally, the gate insulating film is provided at a uniform thickness all over the transparent substrate in order to maintain insulation between layers. In particular, it is practically impossible to decrease the thickness of the gate insulating film at the position above the gate electrode, which serves as a terminal of the TFT, because the electrostatic withstand voltage of the TFT needs to be maintained. In the liquid crystal display device of the present invention, however, the insulating layer, which is a part of the gate insulating film constituted by a plurality of layers, is formed with a smaller thickness above the auxiliary capacitor line, so that an insulating film with a small thickness is obtained above the auxiliary capacitor line without reducing the thickness of the entire gate insulating film. Thus, the above-described effect is achieved with no adverse influence being exerted on other components. In addition, since the auxiliary capacitor can be formed simply by extending the drain electrode, the arrangement of the auxiliary capacitor, which blocks light, can be performed efficiently, and the aperture ratio is improved.

Also, in the liquid crystal display device of the present invention, the portion of the insulating layer that is positioned above the auxiliary capacitor line may be constituted by one of a plurality of layers that constitute the gate insulating film. That one of the plurality of layers may be the uppermost layer or the layer that is the closest to the transparent substrate. In this case, by using materials having different etching characteristics for the layers of the gate insulating film and etching away only unnecessary layers, for example, it is possible to form the above-described thin insulating layer easily. Also, it is possible to increase the capacitance of the auxiliary capacitor easily by employing the thinnest of the plurality of layers of the gate insulating film as the insulating layer.

Also, in the liquid crystal display device of the present invention, the edges of the thin insulating layer above the auxiliary capacitor line may be positioned inside of the edges of the auxiliary capacitor line. In this case, it is possible to increase the capacitance of the auxiliary capacitor while maintaining a sufficient distance between the upper electrode of the auxiliary capacitor and the scan line and securing the electrostatic withstand voltage between the upper and lower electrodes of the auxiliary capacitor near the edges of the auxiliary capacitor line.

Also, in the liquid crystal display device of the present invention, the gate insulating film has a thickness that does not affect insulation adversely, e.g., 2500 to 5500 Å, and the insulating layer has a small thickness, e.g., 500 to 1500 Å. Therefore, the capacitance of the auxiliary capacitor is increased. The thickness of the gate insulating film is preferably greater than 2800 Å, and the thickness of the insulating layer is preferably around 1000 Å.

Also, in the liquid crystal display device of the present invention, after various wires such as scan lines, signal lines, thin film transistors, etc., are formed, these wires may be covered by the interlayer insulating film. The pixel electrode is formed on the surface of the interlayer film, and therefore the surface is even. As a result, a uniform cell gap is achieved in the liquid crystal display device, and therefore, the liquid crystal display device has excellent display quality. In addition, the pixel electrode is electrically connected to the drain electrode via the contact hole provided above the auxiliary capacitor line. Even if the cell gap at this contact hole differs from the cell gap of its surrounding region, display quality is not affected adversely because, at that contact hole region, the drain electrode, made of a light-blocking material, blocks light from the backlight.

Also, in the liquid crystal display device according to the present invention, a reflector plate may be provided on the front or back surface of the portion of the pixel electrode that corresponds to the thin film transistor and the auxiliary capacitor line. This will provide a semi-transmissive liquid crystal display device easily. Further, a reflector plate may be provided so as to cover the entire area of the front or back surface of the pixel electrode. This will provide a reflective liquid crystal display device easily.

Further, according to the method for manufacturing a liquid crystal display device of the present invention, it is easy to manufacture the liquid crystal display device that produces the above-described effects of the present invention. In the method, the gate insulating film constituted by a plurality of layers, and the semiconductor layer, can be formed continuously in succession. Therefore, as compared with the method of forming the semiconductor layer after the formation and etching of the gate insulating film, the number of processes of shifting the environment of the substrate from a normal pressure to a vacuum can be reduced by one and, in addition, since the contamination that occurs in the etching process for the gate insulating film is less likely to exert effects, the characteristics of the TFT are less likely to deteriorate.

Also, in the method for manufacturing a liquid crystal display device of the present invention, when forming the gate insulating film constituted by a plurality of layers, one of the plurality of insulating layers formed above the auxiliary capacitor line (i.e., the layer that has been formed first or the layer that has been formed last of the layers of the gate insulating film) is removed. Thus, it is easy to form the insulating layer with a smaller thickness than that of the gate insulating film.

Also, in the method for manufacturing a liquid crystal display device of the present invention, the plurality of layers of the gate insulating film may be formed of the same material but with different substrate temperatures for each layer. Thus, it is possible to form the plurality of layers of the gate insulating film so as to have substantially the same composition but different properties by simply varying the substrate temperature without changing the surrounding atmosphere. Moreover, by using this difference in properties, it becomes easy to allow only the insulating layer on the surface of the auxiliary capacitor line to remain by etching. Therefore, there is no need to perform an etching process for each layer when forming the plurality of layers of the gate insulating film. Thus, it becomes possible to prevent contamination of the surface of each layer, and it becomes possible to form a predetermined insulating film and the gate insulating film in a short time. In this case, silicon nitride, silicon oxide, or the like can be used as the forming material of the gate insulating film.

Also, in the method for manufacturing a liquid crystal display device of the present invention, the plurality of layers of the gate insulating film may be formed of the same material but with different ingredients of the surrounding atmospheric gas for each layer. By using difference in properties based on this difference in composition, it is possible to allow only the insulating layer on the surface of the auxiliary capacitor line to remain by etching. Therefore, there is no need to perform an etching process for each layer when forming the plurality of layers of the gate insulating film. Thus, it becomes possible to prevent contamination of the surface of each layer, and it becomes possible to form a predetermined insulating film and the gate insulating film in a short time. This gate insulating film constituted by a plurality of thin films of different composition is preferably composed of a silicon nitride layer and a silicon oxide layer, and it is further preferable that the uppermost layer be constituted by a silicon nitride layer.

BRIEF DESCRIPTION OF THE DRAWINGS

FIGS. 4A to 4E are cross-sectional views of the array substrate of FIG. 1, the views illustrating processes for manufacturing the array substrate subsequent to FIG. 3G.

FIGS. 5A to 5E are cross-sectional views of an array substrate according to a second embodiment, the views illustrating processes for manufacturing the array substrate.

FIGS. 6A to 6D are cross-sectional views of the array substrate according to the second embodiment, the views illustrating processes for manufacturing the array substrate subsequent to FIG. 5E.

FIGS. 7A to 7F are cross-sectional views of an array substrate according to a third embodiment, the views illustrating processes for manufacturing the array substrate.

FIG. 9A is a plan view of an array substrate of a first example of related art. FIG. 9B is a cross-sectional view of the array substrate taken along line IXB-IXB of FIG. 9A.

FIGS. 11A to 11G are partial cross-sectional views of the array substrate of FIG. 10, the views illustrating processes for manufacturing the array substrate in sequential order.

DETAILED DESCRIPTION OF THE PREFERRED EMBODIMENTS

Hereinafter, preferred embodiments of the present invention will be described with reference to the accompanying drawings. It is to be appreciated that the embodiments presented below simply illustrate liquid crystal display devices that embody the technical concepts of the present invention and methods for manufacturing them. The embodiments are not intended to restrict the present invention to those liquid crystal display devices and the methods for manufacturing them. Adaptations could yield other embodiments equally valid within the scope of the claims. Note that although the liquid crystal display devices according to the embodiments described below are transmissive liquid crystal display devices, it is obvious that the present invention is not limited to a transmissive liquid crystal display device but is also applicable to a semi-transmissive liquid crystal display device and a reflective liquid crystal display device.

First Embodiment

Figure 1:
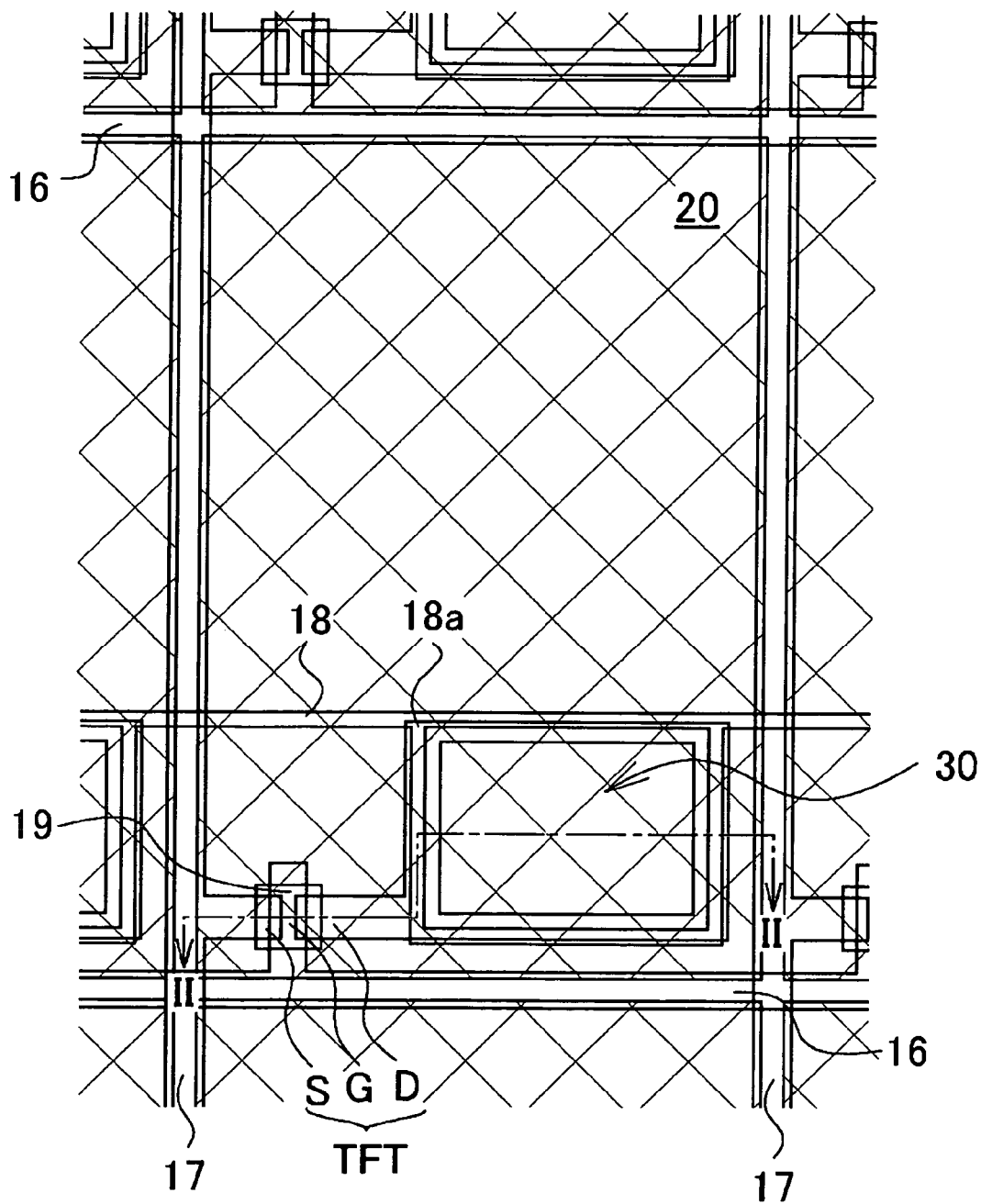
FIG. 1 is an enlarged plan view of a liquid crystal display device according to a first embodiment, the view illustrating a portion thereof corresponding to one pixel with a color filter substrate invisible.
Figure 2:
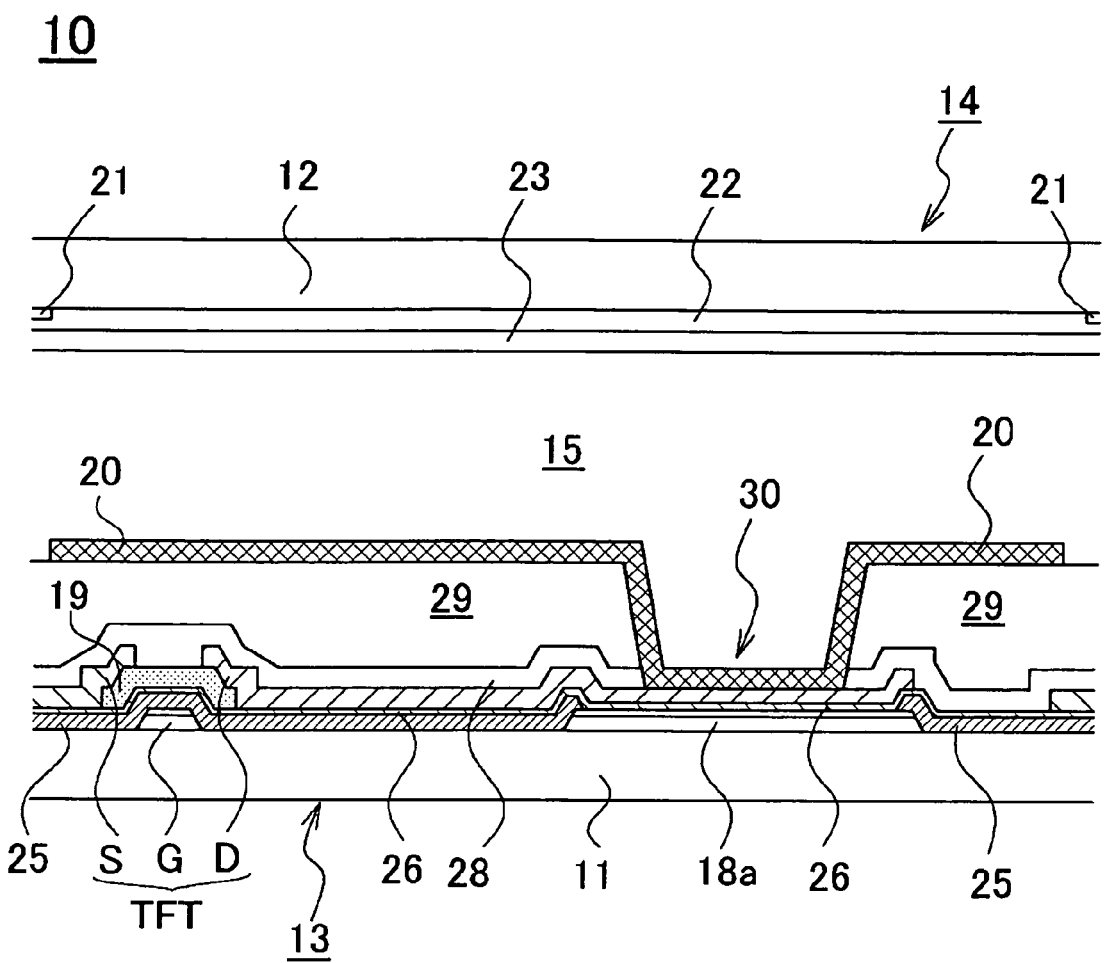
FIG. 2 is a cross-sectional view of the liquid crystal display device taken along line II-II of FIG. 1.
Figure 3:
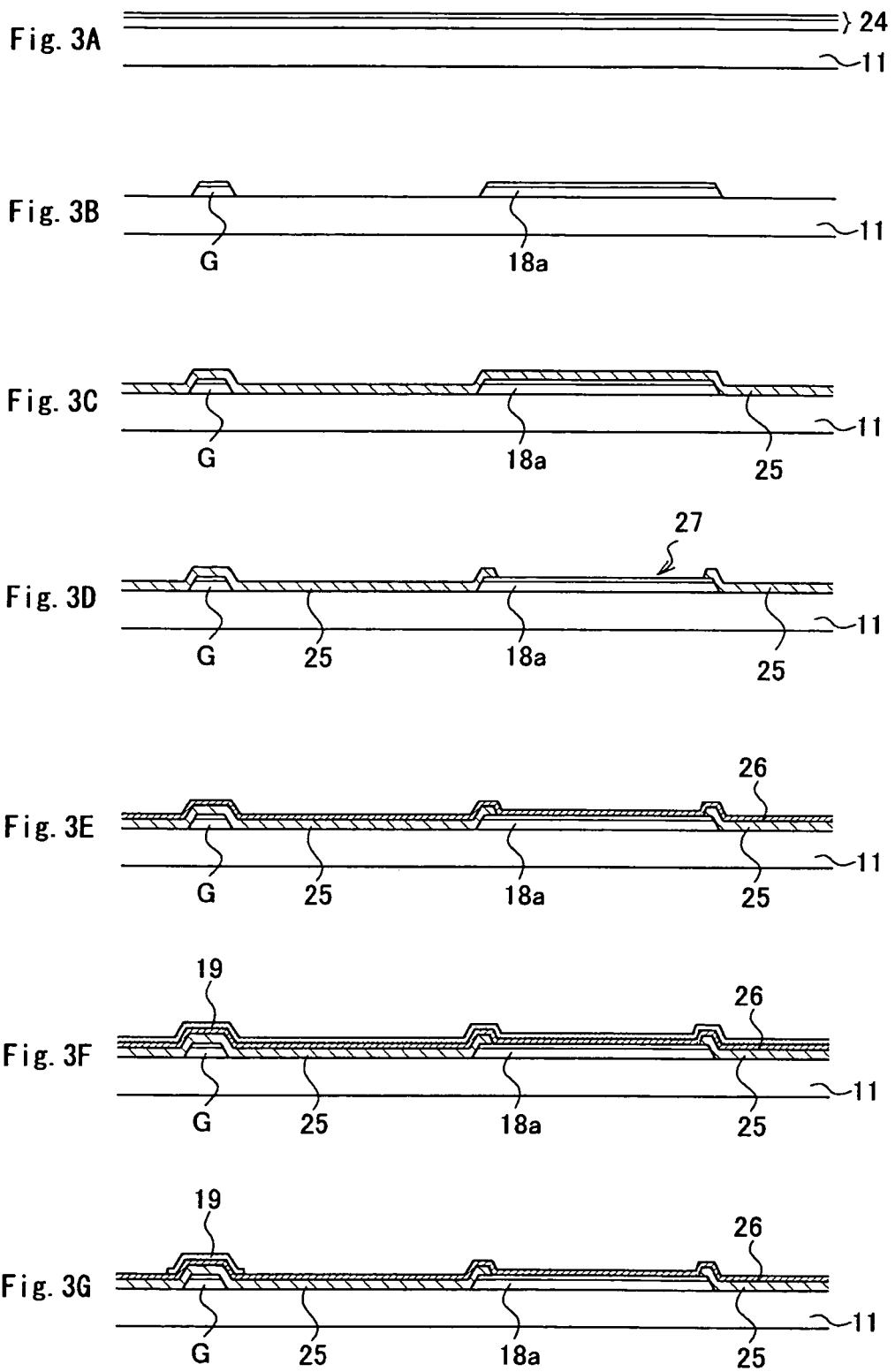
FIGS. 3A to 3G are cross-sectional views of an array substrate of FIG. 1, the views illustrating processes for manufacturing the array substrate.

FIG. 1 is an enlarged plan view of a liquid crystal display device according to a first embodiment of the present invention, the view illustrating a portion thereof corresponding to one pixel with an opposite substrate, e.g., a color filter substrate invisible. FIG. 2 is a cross-sectional view of the liquid crystal display device taken along line II-II of FIG. 1. FIGS. 3 and 4 are cross-sectional views of an array substrate of the liquid crystal display device of FIG. 1, the views illustrating processes for manufacturing the array substrate. Note that FIGS. 3 and 4 each illustrate a cross section of the array substrate taken along line II-II of FIG. 1.

A liquid crystal display device 10 according to the first embodiment includes a pair of substrates (i.e., an array substrate 13 and a color filter substrate 14) that are bonded together with sealants (not shown) disposed in the peripheral regions of the surfaces of the pair of substrates, and liquid crystal 15 injected into a space between the pair of substrates. The array substrate 13 and the color filter substrate 14 are composed of transparent substrates 11 and 12, respectively, made of glass or the like and with various wires and the like formed on the inside surfaces thereof.

Various wires and the like are formed on (the inside surfaces of) the array substrate 13 and the color substrate 14. On the array substrate 13 are provided: a plurality of scan lines 16 and a plurality of signal lines 17 arranged in a matrix; a plurality of auxiliary capacitor lines 18 provided between the scan lines 16 so as to be in parallel with the scan lines 16; thin film transistors (TFTs) each including a source electrode S, a gate electrode G, a drain electrode D, and a semiconductor layer 19; and pixel electrodes 20 each of which covers an area enclosed by the scan lines 16 and the signal lines 17. Note that polysilicon (p-Si) or amorphous silicon (a-Si) is normally used for the semiconductor layer 19 of the TFT. However, polysilicon (p-Si) or amorphous silicon (a-Si) need not necessarily be used for the semiconductor layer 19 of the TFT. Any active element is applicable thereto.

On the color filter substrate 14 are normally provided: a black matrix 21 arranged in a matrix coinciding with the pixel regions of the array substrate 13; a color filter 22 of, e.g., red (R), green (G), and blue (B) provided in the regions enclosed by the black matrix 21; and a common electrode 23 provided so as to be electrically connected to the electrodes on the array substrate and cover the color filter 22. Note that, however, the present invention is not limited to the above arrangement. For example, in the case of an in-plane switching liquid crystal display device, the common electrode may be omitted. Further, in the case of a black and white display, the color filter may be omitted. Still further, in the case of a color compensation display, a color filter of more than three colors instead of the three primary colors may be used for the color filter 22.

A plurality of spacers or the like are arranged as necessary in the space enclosed by the array substrate 13, the color filter substrate 14, and the sealants in order to maintain a uniform distance between the substrates 13 and 14. In addition, the liquid crystal 15 is sealed in the space.

Next, a process for manufacturing the array substrate 13 of the above-described liquid crystal display device 10 will now be described with reference to FIGS. 3 and 4.

First, as illustrated in FIG. 3A, a conductive material layer 24 having a predetermined thickness and made of aluminum, molybdenum, chromium, or an alloy thereof is formed on the transparent substrate 11. Then, as illustrated in FIG. 3B, patterning is performed using known photolithography to remove portions of the conductive material layer 24 by etching, thereby forming the plurality of scan lines 16 extending in a lateral direction and, between the scan lines 16, the auxiliary capacitor lines 18. Note that in FIG. 3B, the gate electrode G extending from the scan line 16 and an auxiliary capacitor electrode 18a formed by expanding the width of a portion of the auxiliary capacitor line 18 are shown. Also note that the scan line 16 and the auxiliary capacitor line 18 as illustrated herein are wires having a multilayered structure formed of aluminum and molybdenum. Aluminum has the advantage of a low resistance but, on the other hand, has the drawbacks of vulnerability to corrosion and a high contact resistance with ITO. Such drawbacks can be eliminated by forming a multilayered structure in which molybdenum covers aluminum.

Next, an insulating film (i.e., a first layer) 25 having a predetermined thickness is formed so as to cover the transparent substrate 11, on which the scan lines 16 and the auxiliary capacitor lines 18 have been formed by the above process. For the insulating film (the first layer) 25, a transparent resin material, e.g., silicon nitride, is used. Since the thickness of the insulating film (the first layer) 25 affects isolation of the scan line 16 and the gate electrode G, the thickness of the insulating film (the first layer) 25 is preferably in the range of 2500 to 5500 Å and more preferably greater than 2800 Å. Then, after the insulating film (the first layer) 25 is formed, just that portion thereof that is positioned above the auxiliary capacitor electrode 18a is etched away to form a window portion 27, as illustrated in FIG. 3D.

After the above process is completed, an insulating layer (i.e., a second layer) 26 having a smaller thickness than that of the insulating film (the first layer) 25 is formed so as to cover the transparent substrate 11, as illustrated in FIG. 3E. The insulating layer (the second layer) 26 is formed on the insulating film (the first layer) 25 and the auxiliary capacitor electrode 18a, above which a portion of the insulating film (the first layer) 25 has been removed by etching as described above. As a result, the scan line 16 and the gate electrode G are covered by a combination of the insulating film (the first layer) 25 and the insulating layer (the second layer) 26, and these two layers constitute a gate insulating film. On the other hand, the auxiliary capacitor electrode 18a is covered only by the insulating layer (the second layer) 26. The material of the insulating layer (the second layer) 26 may be either the same material used for the insulating film (the first layer) 25, i.e., silicon nitride, or another insulating material such as silicon oxide or the like. The thickness of the insulating layer (the second layer) 26 is smaller than that of the insulating film (the first layer) 25, and is preferably in the range of 500 to 1500 Å, more preferably around 1000 Å, in the range of 800 to 1200 Å, for example.

A purpose of the above processes is to form, by the same method used for forming the gate insulating film, an insulating film having a smaller thickness than that of the layer that covers the gate electrode (i.e., the layer that covers the region surrounding the auxiliary capacitor line) on a principal portion of the auxiliary capacitor electrode 18a of the auxiliary capacitor line 18. As such, forming the insulating layer (the second layer) 26 specially is also conceivable as an alternative method for accomplishing the above purpose. For the sake of effectiveness and film quality, it is desirable to form the gate insulating film in a multilayered structure of, e.g., 2 to 5 layers and to form the insulating layer from at least one of those layers. In this case, it is possible to form the insulating layer by the lowermost one of the plurality of layers that constitute the gate insulating film that was formed with a different etching characteristic, e.g., with different film quality. The most effective method is the one as described above, i.e., to form the first layer with a large thickness, remove a portion thereof up to the surface of the electrode by etching, and form an insulating layer in the form of a thin film. In this preferred method, the insulating layer is constituted by the uppermost layer of the gate insulating film. In this manner, it is possible to form the insulating layer from the thinnest one of the plurality of layers that constitute the gate insulating film, so that auxiliary capacitance is greatly increased.

Next, as illustrated in FIG. 3F, on the insulating layer (the second layer) 26, a silicon layer, e.g., an a-Si layer, is formed with a thickness of 1800 Å. Then, as illustrated in FIG. 3G, the a-Si layer is etched away so as to leave only the portion thereof that covers the gate electrode G, thereby forming the semiconductor layer 19, which forms a part of the TFT. Then, as illustrated in FIG. 4A, a film of a conductive material is formed over the transparent substrate 11 by a similar method, and patterning is performed to form: the plurality of signal lines 17 extending in a direction perpendicular to the scan lines 16; the source electrode S extending from the signal line 17 and connected to the semiconductor layer 19; and the drain electrode D which covers the auxiliary capacitor electrode 18a and one end of which connected to the semiconductor layer 19. As a result, the TFT, which functions as a switching element, is formed in the vicinity of an intersection of the scan line 16 and the signal line 17 of the transparent substrate 11.

Further, as illustrated in FIG. 4B, for the sake of surface stabilization, a protective insulating film 28 of an inorganic insulating material is formed over the transparent substrate 11 so as to cover the above-described various wires, and subsequently, as illustrated in FIG. 4C, an interlayer film 29 of an organic insulating material is formed for planarization of the surface of the array substrate 13. Note that a hole is provided in the portion of the interlayer film 29 that is positioned above the auxiliary capacitor electrode 18a. This hole is provided to form a contact hole 30 for electrically connecting the drain electrode D and the pixel electrode 20, which will be described later. However, the position of this hole is not limited to the position above the auxiliary capacitor electrode 18a. When the array substrate 13 and the color filter substrate 14 are assembled to form the liquid crystal display device 10, the distance between the two substrates at the portion where the contact hole 30 is formed will be different from the distance at other portions, and this difference may lead to unevenness in display quality. As such, the hole is preferably provided at the position above the auxiliary capacitor electrode 18a as it is made of a light-blocking material. Then, as illustrated in FIG. 4D, the portion of the protective insulating film 28 (made of an inorganic insulating material) that is exposed at the hole formed in the interlayer film 29 is removed. Finally, as illustrated in FIG. 4E, the pixel electrode 20 made, for example, of an indium tin oxide (ITO) is formed at each pixel region enclosed by the scan lines 16 and the signal lines 17. At this time, it is preferable that portions of the pixel electrode 20 be positioned above the scan line 16 and the signal line 17 and that adjacent pixel electrodes 20 are provided so as not to be in contact with each other. The array substrate 13 is manufactured by the above processes.

An auxiliary capacitor of the array substrate 13 formed by the above processes has a capacitor structure in which the auxiliary capacitor electrode 18a and the drain electrode D connected to the pixel electrode 20 serve as electrodes while the insulating layer (the second layer) 26 with a thickness of 1000 Å serves as a dielectric. Thus, since the dielectric is constituted by an insulating film with a smaller thickness than that of the gate insulating film (i.e., a thickness of 2500 to 4500 Å) in the related art, the capacitance is greatly increased. Moreover, because the gate electrode G and the scan line 16 are covered by the combination of the insulating film (the first layer) 25 and the insulating layer (the second layer) 26 layered one over the other, isolation of the gate electrode G and the scan line 16 is secured.

Further, that increase in capacitance makes it possible to reduce the size of the electrodes that form part of the auxiliary capacitor, increasing the aperture ratio of the pixel. Still further, because the drain electrode D serves also as one of the electrodes that form part of the auxiliary capacitor, it is possible to make the light-blocking portion of the pixel smaller than in the case where a special dedicated electrode (a conductive layer) is provided as one of the electrodes of the auxiliary capacitor instead of using the drain electrode D for that purpose as well, resulting in additional improvement in the aperture ratio.

In order to increase the capacitance of the auxiliary capacitor, it is desirable to make thinner the entire portion of the insulating film that forms part of the auxiliary capacitor. In the present embodiment, the auxiliary capacitor portion of the insulating film is made thinner as a result of removing a part of the insulating film (the first layer) 25. Therefore, in order to increase the capacitance in the present embodiment, it is desirable that the removed part of the insulating film (the first layer) 25 be wider than the auxiliary capacitor electrode 18a. In other words, for that purpose, it is desirable that the edges of the window portion 27 of the insulating film (the first layer) 25 be positioned outside of the edges of the auxiliary capacitor electrode 18a. However, in the case where the drain electrode D serves also as one of the electrodes of the auxiliary capacitor, the auxiliary capacitor is disposed close to the scan line 16. Therefore, if the portion of the insulating film that is positioned outside of the auxiliary capacitor portion is made thinner, the distance between the upper electrode (i.e., the drain electrode D) of the auxiliary capacitor and the scan line 16 will become too short, resulting in a problem of parasitic capacitance or the like. Therefore, in the case where the drain electrode D serves also as the upper electrode of the auxiliary capacitor, there is a need to make thinner the auxiliary capacitor portion of the insulating film while at the same time maintaining a sufficient distance between the upper electrode of the auxiliary capacitor and the scan line 16. As such, the edges of the thinner portion of the insulating film are arranged to be inside of the edges of the auxiliary capacitor electrode 18a. In addition, the insulating film formed on the auxiliary capacitor electrode 18a is likely to be thinner near the edges of the auxiliary capacitor electrode 18a than at other positions. Therefore, in order to secure the electrostatic withstand voltage between the auxiliary capacitor electrode 18a and the upper electrode near the edges of the auxiliary capacitor electrode 18a, it is desirable that the insulating film be thicker near the edges of the auxiliary capacitor electrode 18a than at positions near the center of the auxiliary capacitor electrode 18a. In the present embodiment, the edges of the removed portion (i.e., the window portion 27) of the insulating film (the first layer) 25 are arranged to be inside of the edges of the auxiliary capacitor electrode 18a, and thereby a sufficient distance is maintained between the upper electrode (i.e., the drain electrode D) of the auxiliary capacitor and the scan line 16 while at the same time the electrostatic withstand voltage between the upper electrode and the auxiliary capacitor electrode is secured.

In the present embodiment, as a method for making thinner the auxiliary capacitor portion of the insulating film, a method is employed of forming the insulating film (the first layer) first, then removing the portion of the insulating film (the first layer) that corresponds to the auxiliary capacitor electrode, and then forming the insulating film (the second layer) with a smaller thickness than that of the insulating film (the first layer). There are other methods for making thinner the auxiliary capacitor portion of the insulating film, such as a method of forming a rather thick insulating film first and then making thinner a part of the rather thick insulating film by etching. However, with the method adopted in the present embodiment, it is easier to control the thickness of the auxiliary capacitor portion of the insulating film and form the insulating film with a uniform thickness.

As described above, according to the liquid crystal display device of the present invention, it is possible to increase the capacitance of the auxiliary capacitor without increasing the area of the auxiliary capacitor electrode made of a light-blocking material. Moreover, since portions of the pixel electrode 20 are positioned above the scan line 16 and the signal line 17 and adjacent pixel electrodes 20 are arranged so as not to be in contact with each other, display troubles such as crosstalk, flickering, and the like can be prevented without reducing the aperture ratio of each pixel. In addition, because the pixel electrode 20 is provided on the flat interlayer film 29, it is possible to achieve a uniform cell gap, and therefore excellent display quality, in the liquid crystal display device 10 obtained.

Note that in the case of a semi-transmissive liquid crystal display device instead of a transmissive liquid crystal display device, fine recesses and projections are formed on parts of the surface of the interlayer film 29 formed over the entire area of the pixel electrode except for the contact hole 30 area and, in addition, a reflective film made of a light-reflecting material is formed either between the portion where the recesses and projections are formed and the pixel electrode 20 or on the front surface of the pixel electrode 20. In a semi-transmissive liquid crystal display device, the area of the light-transmitting portion is smaller than in the transmissive liquid crystal display device. Therefore, the liquid crystal display device and the method for manufacturing the same of the present invention, which is capable of increasing the area of an aperture, are particularly effective for the semi-transmissive liquid crystal display device. In the case of a reflective liquid crystal display device, a reflective film is formed either between the interlayer film 29 and the pixel electrode 20 or on the entire front surface of the pixel electrode 20.

Second Embodiment

Next, a process for manufacturing an array substrate of a liquid crystal display device 10A according to a second embodiment will now be described with reference to FIGS. 5 and 6. An enlarged plan view of the liquid crystal display device 10A according to the second embodiment, the view illustrating a portion thereof corresponding to one pixel of the array substrate with the color filter substrate invisible, would be similar to that of the liquid crystal display device 10 according to the first embodiment as illustrated in FIG. 1. Also, a cross-sectional view of the array substrate according to the second embodiment taken along a line corresponding to line II-II of FIG. 1 would be similar to that of the liquid crystal display device 10 according to the first embodiment as illustrated in FIG. 2. Therefore, FIGS. 1 and 2 will be referred to as necessary in a description provided below, in which elements similar to the liquid crystal display device 10 according to the first embodiment are denoted by the same reference numerals. FIGS. 5A to 5E and 6A to 6D are cross-sectional views illustrating the processes for manufacturing the array substrate of the liquid crystal display device 10A according to the second embodiment. Note that FIGS. 5A to 5E and 6A to 6D each illustrate a cross section of the array substrate taken along the line corresponding to line II-II of FIG. 1.

First, as illustrated in FIG. 5A, the conductive material layer 24 having a predetermined thickness and made of aluminum, molybdenum, chromium, or an alloy thereof is formed on the transparent substrate 11. Then, as illustrated in FIG. 5B, patterning is performed using known photolithography to etch away portions of the conductive material layer 24, thereby forming the plurality of scan lines 16 extending in the lateral direction, the gate electrodes G connecting with the scan lines 16, and, between the scan lines 16, the auxiliary capacitor lines 18. Note that in FIG. 5B, the gate electrode G extending from the scan line 16 and the auxiliary capacitor electrode 18a formed by expanding the width of a portion of the auxiliary capacitor line 18 are shown.

Next, as illustrated in FIG. 5C, the transparent substrate 11 on which the scan lines 16 and the auxiliary capacitor lines 18 have been formed by the above process is heated in a vacuum chamber to a high temperature, e.g., 350° C., and on the surface thereof, the insulating film (the first layer) 25 made of silicon nitride and having a predetermined thickness (e.g., 1000 Å) is formed by a common method, such as plasma chemical vapor deposition (CVD) or the like. After that, the temperature of the transparent substrate 11 on which the insulating film (the first layer) 25 has been formed is lowered to a temperature lower than the original temperature, e.g., to 250° C., and similarly by plasma CVD or the like, the insulating layer (the second layer) 26 made of silicon nitride and having a predetermined thickness (e.g., 3000 Å) is formed thereon. The insulating film (the first layer) 25 and the insulating layer (the second layer) 26 constitute the gate insulating film. Further, the semiconductor layer 19 formed from, e.g., an a-Si layer and an n$^+$a-Si layer, is formed on the entire surface of the insulating layer (the second layer) 26 so as to have a predetermined thickness (e.g., 1800 Å for the a-Si layer and 500 Å for the n$^+$a-Si layer).

The formation of the insulating film (the first layer) 25, the insulating layer (the second layer) 26, and the semiconductor layer 19 can be performed continuously without taking the transparent substrate 11 out of the vacuum chamber. Note that the insulating film (the first layer) 25 and the insulating layer (the second layer) 26 are formed with different substrate temperatures, and therefore, they have different hardness although both of them are made of the same material, i.e., silicon nitride. The insulating film (the first layer) 25, which has been formed with a higher substrate temperature, is harder and has a lower wet etching rate in buffered hydrofluoric acid. Note that it is preferable that the thickness of the insulating film (the first layer) 25 be as small as possible as long as short circuits will not occur, preferably in the range of 500 to 1500 Å. The total thickness of the insulating film (the first layer) 25 and the insulating layer (the second layer) 26 is preferably in the range of 2500 to 5500 Å in order to prevent static electricity from causing dielectric breakdown at the gate electrode G portion of the TFT.

Note that, in the above-described process, the insulating films with different etching rates are formed by setting different substrate temperatures at the time of deposition of the insulating films. However, the insulating films with different etching rates can alternatively be formed by using different ingredients for an atmospheric gas. For example, silane gas and nitrogen gas are employed to form silicon nitride, and it is possible to make the insulating film (the first layer) harder than the insulating layer (the second layer) by using a higher proportion of silane gas when forming the second layer than when forming the first layer.

After that, as illustrated in FIG. 5D, the semiconductor layer 19 is selectively removed by dry etching so that the semiconductor layer 19 is left only above the surface of the gate electrode G of the TFT, and then, the portion of the insulating layer (the second layer) 26 that is positioned above the surface of the auxiliary capacitor electrode 18a is removed by wet etching using buffered hydrofluoric acid or by dry etching so that the insulating film (the first layer) 25 is exposed, and thereby the window portion 27 is formed. In this process, the insulating film (the first layer) 25 is able to remain substantially unetched since the etching rate of the insulating film (the first layer) 25 is lower than the etching rate of the insulating layer (the second layer) 26.

Next, a conductive material layer of aluminum, molybdenum, chromium, or an alloy thereof is formed over the transparent substrate 11, and thereafter, as illustrated in FIGS. 1 and 5E, patterning is performed to form: the plurality of signal lines 17 extending in the direction perpendicular to the scan lines 16; the source electrode S extending from the signal line 17 and connected to the semiconductor layer 19; and the drain electrode D which covers the auxiliary capacitor electrode 18a and one end of which is connected to the semiconductor layer 19. As a result, the TFT, which functions as a switching element, is formed in the vicinity of an intersection of the scan line 16 and the signal line 17 of the transparent substrate 11.

Further, as illustrated in FIG. 6A, for the sake of surface stabilization, the protective insulating film 28 of an inorganic insulating material (e.g., silicon nitride) is formed over the transparent substrate 11 so as to cover the above-described various wires, and subsequently, as illustrated in FIG. 6B, the interlayer film 29 of an organic insulating material (e.g., polyimide or the like) is formed for planarization of the surface of the array substrate 13. Then, as illustrated in FIG. 6C, the contact hole 30 is formed by etching at the portions of the interlayer film 29 and the protective insulating film 28 that are positioned above the auxiliary capacitor electrode 18a. Note that the position of the contact hole 30 is not limited to the position above the auxiliary capacitor electrode 18a. However, when the array substrate 13 and the color filter substrate 14 are assembled to form the liquid crystal display device 10A, the distance between the two substrates, i.e., the cell gap, at the portion where the contact hole 30 is formed will be different from the distance at the other portions, and this difference may lead to unevenness in display quality. As such, the contact hole 30 is preferably provided at the position above the auxiliary capacitor electrode 18a as it is made of a light-blocking material.

Then, as illustrated in FIG. 6D, the pixel electrode 20 made of, e.g., ITO, is formed in each pixel region enclosed by the scan lines 16 and the signal lines 17. At this time, in order to prevent light leakage, it is preferable that portions of the pixel electrode 20 be positioned above the scan line 16 and the signal line 17 and that adjacent pixel electrodes 20 be provided so as not to be in contact with each other. The array substrate 13 is manufactured by the above processes.

In an auxiliary capacitor formed by the above-described processes on the array substrate 13 of the liquid crystal display device 10A according to the second embodiment, the auxiliary capacitor electrode 18a and the drain electrode D connected to the pixel electrode 20 correspond to the electrodes of a capacitor while the insulating film (the first layer) 25 arranged between the auxiliary capacitor electrode 18a and the drain electrode D corresponds to the dielectric of the capacitor. In addition, it is possible to allow the thickness of the dielectric formed by the insulating film (the first layer) 25 to fall within the range of 500 to 1500 Å, which is much thinner than a thickness of 2500 to 4500 Å, which is the case with gate insulating films used currently. Therefore, it is possible to greatly increase the auxiliary capacitance without increasing the area of the auxiliary capacitor electrode 18a. Moreover, because the gate electrode G and the scan line 16 are covered by the gate insulating film formed by a combination of the insulating film (the first layer) 25 and the insulating layer (the second layer) 26 layered one over the other, isolation of the gate electrode G and the scan line 16 is secured sufficiently.

As described above, in the liquid crystal display device according to the second embodiment, it is possible to increase the auxiliary capacitance without increasing the area of the auxiliary capacitor electrode 18a made of a light-blocking material. Therefore, it is possible to prevent display troubles such as crosstalk, flickering, and the like without reducing the aperture ratio of each pixel. In addition, since the pixel electrode 20 is provided on the flat interlayer film 29, it is possible to achieve a uniform cell gap, and therefore excellent display quality, in the liquid crystal display device 10A obtained.

Note that the second embodiment has been described with reference to an exemplary case where both the insulating film (the first layer) 25 and the insulating layer (the second layer) 26 are made of silicon nitride. However, both of them may be formed of silicon oxide, and it is also possible that either the insulating film (the first layer) 25 or the insulating layer (the second layer) 26 be formed of silicon oxide and the other be formed of silicon nitride. However, it is preferable that a layer with a higher etching rate be the uppermost layer, and it is preferable from the viewpoint of isolation that the insulating layer (the second layer) 26 be formed of silicon nitride. It is also possible to form the auxiliary capacitor line of aluminum, anodize the surface thereof to form aluminum oxide, and use the resultant film as the auxiliary capacitor portion of the insulating layer.

Third Embodiment

Figure 8:
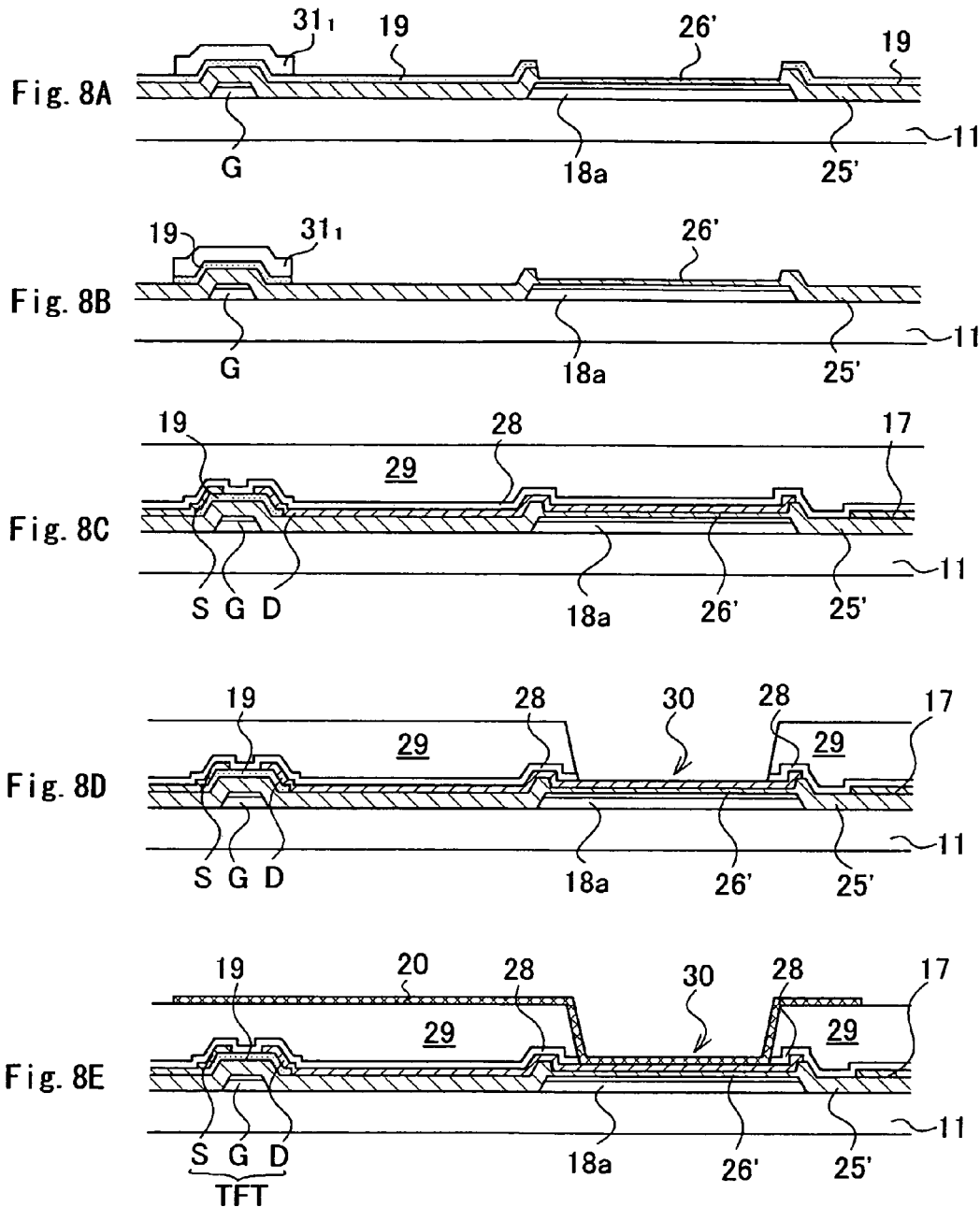
FIGS. 8A to 8E are cross-sectional views of the array substrate according to the third embodiment, the views illustrating processes for manufacturing the array substrate subsequent to FIG. 7F.
Figure 10:
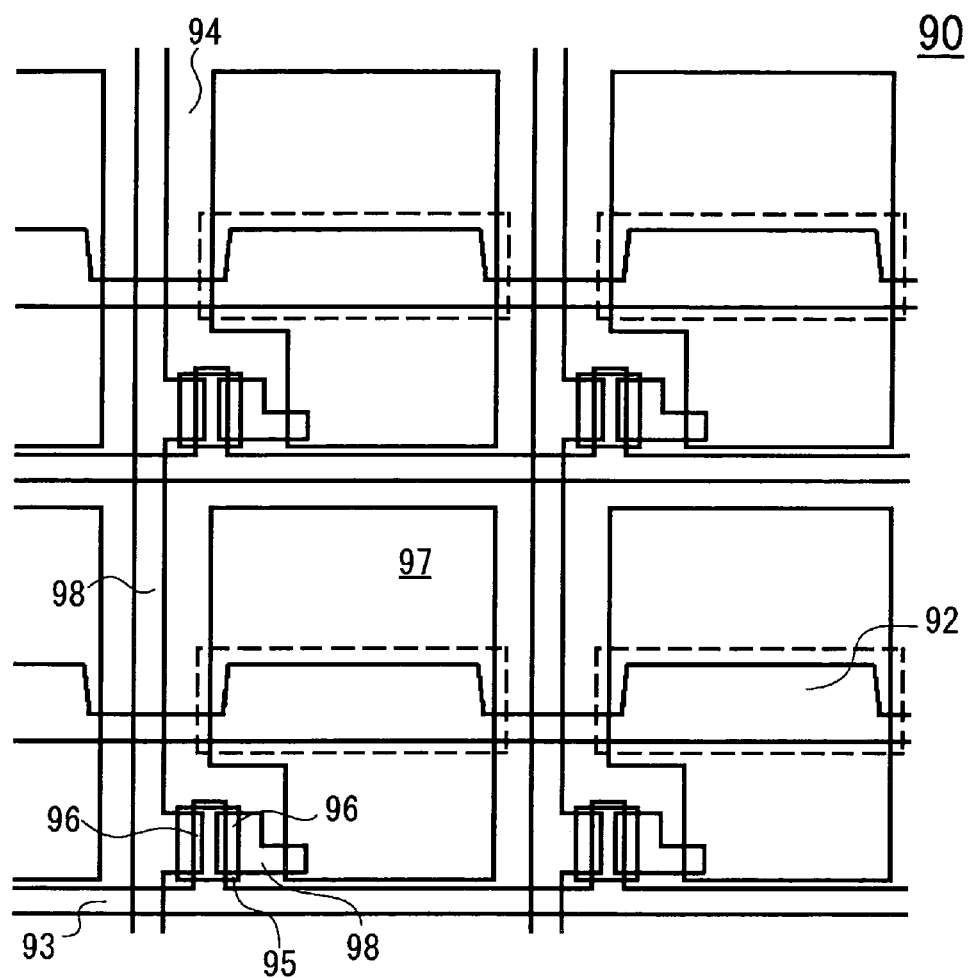
FIG. 10 is a plan view of an array substrate of a second example of related art, the view illustrating a portion thereof corresponding to a few pixels.

Next, a process for manufacturing an array substrate of a liquid crystal display device 10B according to a third embodiment will now be described with reference to FIGS. 7 and 8. An enlarged plan view of the liquid crystal display device 10B according to the third embodiment, the view illustrating a portion thereof corresponding to one pixel of the array substrate with the color filter substrate invisible, would be similar to that of the liquid crystal display device 10 according to the first embodiment as illustrated in FIG. 1. Also, a cross-sectional view of the array substrate according to the third embodiment taken along a line corresponding to line II-II of FIG. 1 would be similar to that of the liquid crystal display device 10 according to the first embodiment as illustrated in FIG. 2. Therefore, FIGS. 1 and 2 will be referred to as necessary in a description provided below, in which elements similar to the liquid crystal display device 10 according to the first embodiment are denoted by the same reference numerals. FIGS. 7A to 7F and 8A to 8E are cross-sectional views illustrating the processes for manufacturing the array substrate of the liquid crystal display device 10B according to the third embodiment. Note that FIGS. 7A to 7F and 8A to 8E each illustrate a cross section of the array substrate taken along the line corresponding to line II-II of FIG. 1.

First, as illustrated in FIG. 7A, the conductive material layer 24 having a predetermined thickness and made of aluminum, molybdenum, chromium, or an alloy thereof is formed on the transparent substrate 11. Then, as illustrated in FIG. 7B, pattering is performed using known photolithography to remove portions of the conductive material layer 24 by etching, thereby forming the plurality of scan lines 16 extending in the lateral direction, the gate electrodes G connecting with the scan lines 16, and, between the scan lines 16, the auxiliary capacitor lines 18. Note that in FIG. 7B, the gate electrode G extending from the scan line 16 and the auxiliary capacitor electrode 18a formed by expanding the width of a portion of the auxiliary capacitor line 18 are shown. The scan lines 16 and the auxiliary capacitor lines 18 illustrated herein have a multilayered structure formed of aluminum and molybdenum in order to have contact with the pixel electrodes.

Next, as illustrated in FIG. 7C, on the surface of the transparent substrate 11 on which the scan lines 16 and the auxiliary capacitor lines 18 have been formed by the above process, an insulating film 25' made of silicon nitride and having a predetermined thickness (e.g., 4000 Å) is formed by a common method, such as plasma chemical vapor deposition (CVD) or the like. Further, the semiconductor layer 19 formed from, e.g., an a-Si layer and an n$^+$a-Si layer, is formed, on the entire surface of the insulating film 25' so as to have a predetermined thickness (e.g., 1800 Å for the a-Si layer and 500 Å for the n$^+$a-Si layer).

The formation of the insulating film 25' and the semiconductor layer 19 can be performed continuously without taking the transparent substrate 11 out of the vacuum chamber. The thickness of the insulating film 25' is preferably in the range of 2500 to 5500 Å in order to prevent static electricity from causing dielectric breakdown at the gate electrode G portion of the TFT.

Thereafter, as illustrated in FIG. 7D, a positive photoresist 31 is applied over the entire surface of the transparent substrate 11 so as to have a uniform thickness, and the photoresist 31 is exposed to light using a halftone mask 32. In the halftone mask 32, a portion 33 corresponding to the gate electrode G of the TFT blocks light completely, a portion 34 corresponding to the auxiliary capacitor electrode 18a allows light to pass, and another portion 35 allows light to pass partially. Therefore, when the photoresist 31 is developed after exposure to light, as illustrated in FIG. 7E, a thick photoresist $31_1$ remains above the surface of the gate electrode G, no photoresist remains above the surface of the auxiliary capacitor electrode 18a, with the result that the semiconductor layer 19 is exposed, and in the remaining region, a photoresist $31_2$ remains that has a smaller thickness than that of the photoresist $31_1$, which is formed above the surface of the gate electrode G.

In this situation, as illustrated in FIG. 7F, a portion of the semiconductor layer 19 positioned above the surface of the auxiliary capacitor electrode 18a is removed by dry etching to expose the insulating film 25', and a part of the insulating film 25' exposed above the surface of the auxiliary capacitor electrode 18a is subjected to wet etching or dry etching using buffered hydrofluoric acid so that an insulating layer 26' with a predetermined thickness (e.g., 1000 Å) remains. Next, as illustrated in FIG. 8A, the thinner photoresist layer $31_2$ is removed by ashing so as to expose the semiconductor layer 19. At this time, a part of the thicker photoresist layer $31_1$, which is positioned above the gate electrode G, is removed by ashing, and thereby the thickness of the thicker photoresist layer $31_1$ is reduced, but the photoresist layer $31_1$ still covers the semiconductor layer 19. Thereafter, as illustrated in FIG. 8B, the exposed portion of the semiconductor layer 19 is removed by dry etching.

Thereafter, the thicker photoresist layer $31_1$ positioned above the gate electrode G is removed by ashing. Then, a conductive material layer of aluminum, molybdenum, chromium, or an alloy thereof is formed over the transparent substrate 11, and thereafter, as illustrated in FIGS. 1 and 8C, patterning is performed to form: the plurality of signal lines 17 extending in the direction perpendicular to the scan lines 16; the source electrode S extending from the signal line 17 and connected to the semiconductor layer 19; and the drain electrode D which covers the auxiliary capacitor electrode 18a and one end of which is connected to the semiconductor layer 19. As a result, the TFT, which functions as a switching element, is formed in the vicinity of an intersection of the scan line 16 and the signal line 17 of the transparent substrate 11. Further, for the sake of surface stabilization, the protective insulating film 28 of an inorganic insulating material (e.g., silicon nitride) is formed over the transparent substrate 11 so as to cover the above-described various wires, and subsequently, the interlayer film 29 of an organic insulating material (e.g., polyimide or the like) is formed for planarization of the surface of the array substrate 13.

Then, as illustrated in FIG. 8D, the contact hole 30 is formed by etching at the portions of the interlayer film 29 and the protective insulating film 28 that are positioned above the auxiliary capacitor electrode 18a. Note that the position of the contact hole 30 is not limited to the position above the auxiliary capacitor electrode 18a. However, when the array substrate 13 and the color filter substrate 14 are assembled to form the liquid crystal display device 10B, the distance between the two substrates, i.e., the cell gap, at the portion where the contact hole 30 is formed will be different from the distance at the other portions, and this difference may lead to unevenness in display quality. As such, the contact hole 30 is preferably provided at the position above the auxiliary capacitor electrode 18a as it is made of a light-blocking material.

Then, as illustrated in FIG. 8E, the pixel electrode 20 made of, e.g., ITO, IZO, or the like is formed in each pixel region enclosed by the scan lines 16 and the signal lines 17. At this time, in order to prevent light leakage, it is preferable that portions of the pixel electrode 20 be positioned above the scan line 16 and the signal line 17 and that adjacent pixel electrodes 20 be provided so as not to be in contact with each other. The array substrate 13 of the liquid crystal display device 10B according to the third embodiment is manufactured by the above processes.

In an auxiliary capacitor of the array substrate 13 formed by the above-described processes according to the third embodiment, the auxiliary capacitor electrode 18a and the drain electrode D connected to the pixel electrode 20 correspond to the electrodes of a capacitor while the insulating layer 26' arranged between the auxiliary capacitor electrode 18a and the drain electrode D corresponds to the dielectric of the capacitor. In addition, it is possible to allow the thickness of the dielectric formed by the insulating layer 26' to fall within the range of 500 to 1500 Å, which is much thinner than a thickness of 2500 to 4500 Å, which is the case with gate insulating films used currently. Therefore, it is possible to greatly increase the auxiliary capacitance without increasing the area of the auxiliary capacitor electrode 18a. Moreover, because the gate electrode G and the scan line 16 are covered by the gate insulating film formed by the insulating film 25', which has a larger thickness than that of the insulating layer 26', isolation of the gate electrode G and the scan line 16 is secured sufficiently.

Note that the third embodiment has been described with reference to an exemplary case where the insulating film 25' is formed by a single silicon nitride layer. In this case, however, the insulating film 25' is homogeneous, resulting in a need for strict control of etching time when subjecting the insulating film 25' to wet etching using buffered hydrofluoric acid to form the insulating layer 26' with a smaller thickness. However, if the insulating film 25' is formed in a multilayered structure formed of materials having different etching rates, etching conditions can be more flexible, resulting in easier manufacture. Suppose, for example, that first a harder silicon nitride film is formed with the transparent substrate 11 at a higher temperature and thereafter a soft silicon nitride film is deposited thereon with the transparent substrate 11 at a lower temperature. In this case, since the soft silicon nitride film has a higher etching rate in buffered hydrofluoric acid, a slight error in etching time will not interfere with obtaining the insulating layer 26' with accurate thickness, as the harder silicon nitride film below is hardly etched.

Further, the insulating film 25' may be formed from a single silicon oxide layer or may be formed in a multilayered structure formed from a silicon nitride layer and a silicon oxide layer. From the viewpoint of isolation, however, it is preferable that the uppermost layer be constituted by a silicon nitride film.

Note that the third embodiment has been described with reference to an exemplary case where both the insulating film 25' and the insulating layer 26' are formed of silicon nitride. However, both of them may be formed of silicon oxide or the like. Further, it is also possible that either the insulating film 25' or the insulating layer 26' be formed of silicon oxide and the other be formed of silicon nitride.

As described above, in the liquid crystal display device 10B according to the third embodiment, it is possible to increase the auxiliary capacitance without increasing the area of the auxiliary capacitor electrode 18a. Therefore, it is possible to prevent display troubles such as crosstalk, flickering, and the like without reducing the aperture ratio of each pixel. Also, in the method for manufacturing the liquid crystal display device 10B according to the third embodiment, the gate insulating film and the semiconductor layer are formed continuously in succession. Therefore, as compared with a known technique in which the formation of the semiconductor layer is performed after the formation and etching of the gate insulating film, the number of processes of shifting the environment of the substrate from a normal pressure to a vacuum can be reduced by one, and, in addition, it is possible to remove the portion of the semiconductor layer that is positioned above the surface of the auxiliary capacitor line by etching employing as a mask the portion of the photoresist layer that remains, because of the halftone mask, in the area surrounding the auxiliary capacitor line, and further, the contamination that occurs in the etching process for the gate insulating film is less likely to exert effects. Therefore, the characteristics of the TFT are less likely to deteriorate. Moreover, in the method for manufacturing the liquid crystal display device 10B according to the third embodiment, after the portion of the semiconductor layer that is positioned above the auxiliary capacitor line is subjected to etching, the formation of the insulating layer can be performed by etching employing as a mask the remaining portions of the photoresist layer and the semiconductor layer as they are. Therefore, although an additional etching process for the semiconductor layer needs to be performed after the formation of the insulating layer, there is no particular need to provide a photolithography process during forming of the insulating layer.

The invention claimed is:

1. A liquid crystal display device, comprising:
a transparent substrate;
a plurality of signal lines and scan lines arranged on said transparent substrate in a matrix;
a plurality of auxiliary capacitor lines provided between said scan lines so as to be in parallel with said scan lines;
thin film transistors each provided in a vicinity of an intersection of said signal lines and scan lines; and
pixel electrodes arranged in respective positions defined by said signal lines and said scan lines and each electrically connected to a drain electrode of said thin film transistor,
said thin film transistor's gate electrode and said scan line being covered by a gate insulating film, and
said thin film transistor's drain electrode extending to overlie said auxiliary capacitor line, with an insulating layer having a smaller thickness than that of said gate insulating film being interposed between the drain electrode and said auxiliary capacitor line, and therby forming an auxiliary capacitor,
wherein the edges of said insulating layer, which is positioned above said auxiliary capacitor line, are positioned inside of the edges of said auxiliary capacitor line.

2. The liquid crystal display device according to claim 1, wherein,
said gate insulating film is constituted by a plurality of layers, and
said insulating layer is constituted by at least one of said plurality of layers.

3. The liquid crystal display device according to claim 2, wherein said insulating layer is constituted by the uppermost one of said plurality of layers that constitute said gate insulating film.

4. The liquid crystal display device according to claim 2, wherein said insulating layer is constituted by one of said plurality of layers that constitute said gate insulating film, said one of said plurality of layers being the one closest to said transparent substrate.

5. The liquid crystal display device according to claim 2, wherein said insulating layer is constituted by one of said plurality of layers that constitute said gate insulating film, said one of said plurality of layers being the thinnest of said plurality of layers.

6. The liquid crystal display device according to claim 1, wherein the thickness of said gate insulating film is in a range of 2500 to 5500 Å, and the thickness of said insulating layer is in a range of 500 to 1500 Å.

7. The liquid crystal display device according to claim 1, further comprising:
an interlayer insulating film formed between said pixel electrode and said drain electrode; and
a contact hole formed at a portion of said interlayer insulating film, said portion being positioned over said auxiliary capacitor line, wherein
said pixel electrode and said drain electrode are electrically connected to each other via said contact hole.

8. The liquid crystal display device according to claim 7, further comprising a reflective film formed on the front or back surface of said pixel electrode so as to cover either said thin film transistor and said auxiliary capacitor line or the entire area of the position corresponding to said pixel electrode.

9. A method for manufacturing a liquid crystal display device, the method comprising:
(a) arranging, on a transparent substrate, a plurality of scan lines connecting with gate electrodes and a plurality of auxiliary capacitor lines so as to be in parallel with each other;
(b) forming a gate insulating film so as to cover the entire area of said transparent substrate;
(c) making thinner a portion of said gate insulating film to form an insulating layer with a smaller thickness than that of the region surrounding said auxiliary capacitor line, said portion being positioned above said auxiliary capacitor line; and
(d) forming a drain electrode of a thin film transistor above said gate insulating film and extending said drain electrode of said thin film transistor so as to cover said insulating layer positioned above said auxiliary capacitor line, thereby forming an auxiliary capacitor,
wherein the edges of said insulating layer, which is positioned above said auxiliary capacitor line, are positioned inside of the edges of said auxiliary capacitor line.

10. The method for manufacturing a liquid crystal device according to claim 9, wherein said step (c) includes:
forming a semiconductor layer on said gate insulating film;
applying photoresist onto a surface of said semiconductor layer;
by use of a halftone mask, removing an auxiliary capacitor formation portion of said photoresist and allowing thick photoresist to remain at a position corresponding to said gate electrode and thin photoresist to remain at the other position, said auxiliary capacitor formation portion being positioned above said auxiliary capacitor line;
after etching away said auxiliary capacitor formation portion of said semiconductor layer, which is exposed, further removing a portion of said gate insulating film to form an insulating layer with a smaller thickness than that of the portion of said gate insulating film that surrounds said insulating layer, said portion of said gate insulating film corresponding to said auxiliary capacitor formation portion;
removing said thin photoresist to allow said photoresist to remain only at a position corresponding to said gate electrode;
removing an exposed portion of said semiconductor layer by etching; and
removing the remaining portion of said photoresist.

11. The method for manufacturing a liquid crystal device according to claim 9, wherein,
said step (b) includes forming a plurality of layers to form said gate insulating film, and
said step (c) includes removing at least one of said plurality of layers.

12. The method for manufacturing a liquid crystal device according to claim 11, wherein said removing of at least one of said plurality of layers consists of removing that one of said plurality of layers that was formed first.

13. The method for manufacturing a liquid crystal device according to claim 11, wherein said removing of at least one of said plurality of layers consists of removing that one of said plurality of layers that was formed last.

14. The method for manufacturing a liquid crystal device according to claim 11, wherein said plurality of layers that constitute said gate insulating film are all made of an identical material and have been formed by setting a different substrate temperature for each layer.

15. The method for manufacturing a liquid crystal device according to claim 14, wherein,
a highest substrate temperature is set when forming a first gate insulating film, and
progressively lower substrate temperatures are set for the subsequent gate insulating film in order of formation.

16. The method for manufacturing a liquid crystal device according to claim 11, wherein said plurality of layers that constitute said gate insulating film are all made of an identical material and have been formed by using, for each layer, a different ingredient for a surrounding atmospheric gas.

17. The method for manufacturing a liquid crystal device according to claim 9, further comprising:
forming an interlayer insulating film so as to cover said drain electrode;
forming a contact hole at a portion of said interlayer insulating film, said portion corresponding to the position where said drain electrode overlies said auxiliary capacitor line; and
forming, on said interlayer insulating film, a pixel electrode so as to be electrically connected to said drain electrode via said contact hole.

18. The method for manufacturing a liquid crystal device according to claim 17, further comprising forming, prior to or after forming of said pixel electrode, a reflector plate either at positions corresponding to said thin film transistor and said auxiliary capacitor line or in the entire region corresponding to said pixel electrode.

* * * * *